(12) United States Patent
Nguyen et al.

(10) Patent No.: US 6,248,805 B1
(45) Date of Patent: *Jun. 19, 2001

(54) INK-JET PRINTING INK COMPOSITIONS HAVING MAGNETIC PROPERTIES AND SPECIFIC CORE/SHELL BINDER

(75) Inventors: Khe C. Nguyen, Los Altos; Sivapackia Ganapathiappan, Mountain View, both of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/183,393

(22) Filed: Oct. 29, 1998

Related U.S. Application Data

(63) Continuation-in-part of application No. 09/120,270, filed on Jul. 21, 1998, now Pat. No. 6,057,384, which is a continuation-in-part of application No. 08/998,164, filed on Dec. 24, 1997, now Pat. No. 5,990,202, which is a continuation-in-part of application No. 08/962,496, filed on Oct. 31, 1997, now abandoned.

(51) Int. Cl.[7] ............... C01G 49/02; C01G 51/04; C01G 53/04; C01G 57/00
(52) U.S. Cl. ............................ 523/160; 523/160
(58) Field of Search ...................... 523/160, 161, 523/201; 525/404, 418; 526/323.2; 252/62.56; 427/128; 106/31.32, 31.64; 524/176, 504, 398, 431

(56) References Cited

U.S. PATENT DOCUMENTS

| | | | |
|---|---|---|---|
| 4,170,582 | * 10/1979 | Mori et al. | 524/531 |
| 4,419,471 | * 12/1983 | Nelsen et al. | 524/100 |
| 4,565,764 | 1/1986 | Nakahara et al. | 430/111 |
| 4,829,101 | 5/1989 | Kraemer et al. | 523/201 |
| 4,867,910 | * 9/1989 | Meguro et al. | 252/62.56 |
| 4,876,313 | 10/1989 | Lorah | 525/281 |
| 5,139,574 | * 8/1992 | Winnik et al. | 524/84 |
| 5,160,372 | 11/1992 | Matrick | 106/19 R |
| 5,212,251 | * 5/1993 | Lorah et al. | 525/279 |
| 5,453,458 | * 9/1995 | Takeuchi et al. | 523/201 |
| 5,461,125 | * 10/1995 | Lu et al. | 525/293 |
| 5,506,079 | * 4/1996 | Grigoryan et al. | 430/106 |
| 5,531,816 | * 7/1996 | Wickramanayake | 106/31.78 |
| 5,536,612 | 7/1996 | Yamaguchi et al. | 430/137 |
| 5,607,999 | 3/1997 | Shimizu et al. | 524/503 |
| 5,616,644 | 4/1997 | Schlarb et al. | 524/522 |
| 5,698,616 | * 12/1997 | Baker et al. | 523/301 |
| 5,708,095 | * 1/1998 | Page et al. | 525/301 |
| 5,712,339 | * 1/1998 | Guerin et al. | 524/515 |
| 5,814,685 | * 9/1998 | Satake et al. | 523/201 |
| 5,821,283 | * 10/1998 | Hesler et al. | 523/161 |
| 5,853,861 | * 12/1998 | Held | 428/207 |
| 5,889,083 | * 3/1999 | Zhu | 523/161 |
| 5,912,280 | * 6/1999 | Anton et al. | 523/161 |
| 5,977,207 | * 11/1999 | Yui et al. | 523/160 |
| 5,990,202 | * 11/1999 | Nguyen et al. | 523/160 |

FOREIGN PATENT DOCUMENTS

| | | |
|---|---|---|
| 0068903 | 5/1983 | (EP) . |
| 0796901 | 9/1997 | (EP) . |
| 03160069 | 7/1991 | (JP) . |
| XP-002093443 | 11/1993 | (JP) . |

* cited by examiner

Primary Examiner—Vasu Jagannathan
Assistant Examiner—Callie E. Shosho

(57) ABSTRACT

Specific core-shell binders and magnetic additives for use in ink-jet printing ink compositions are provided. One class of specific core/shell binders has the general formula $[A_m B_n C'_p]_x$, where A and B are hydrophobic components in which A exhibits a glass transition temperature $T_g$ between about −150° and +25° C. and B exhibits a glass transition temperature greater than 25° C., C' is a component that forms hydrophilic or water-soluble component in the polymer chain, and has an ionic or non-ionic structure, m<30 wt %, n>40 wt %, and p<30 wt %, with the total of m+n+p=100 wt %, and x=1 to 100,000. The molecular weight (weight average) of the polymer is between about 1,000 and 2,000,000. The polymers useful in the practice of the invention are prepared by emulsifying the monomers and then conducting a free-radical polymerization in water. The foregoing binder polymer is used in conjunction with magnetic additives comprising either (a) inorganic magnetic compound containing at least one of iron, cobalt, and nickel or (b) organic magnetic complexes containing at least one of iron, cobalt, and nickel or (c) organic charge transfer complexes that exhibit magnetic properties. The ratio of binder (I) to colorant (pigment) is greater that 1 to 10. The concentration of the magnetice additive is within the range of 1 to 30 wt %. The general ink formulation comprises: 5 to 50 wt % water-miscible solvent; 0.5 to 10 wt % colorant; 1 to 30 wt % magnetice additive; and water.

24 Claims, 1 Drawing Sheet

INK-JET PRINTING INK COMPOSITIONS HAVING MAGNETIC PROPERTIES AND SPECIFIC CORE/SHELL BINDER

CROSS-REFERENCE TO RELATED APPLICATION

The present application is a continuation-in-part of application Ser. No. 09/120,270, filed Jul. 21, 1998, now U.S. Pat. No. 6,057,384, issued May 2, 2000 which in turn is a continuation-in-part of application Ser. No. 08/998,164, filed Dec. 24, 1997, now U.S. Pat. No. 5,990,202, issued Nov. 23, 1999 which in turn is a continuation-in-part of application Ser. No. 08/962,496, filed Oct. 31, 1997, now abandoned. Those applications are directed to core/shell polymers in general for use in a variety of applications, including ink-jet printing inks, and to printing inks containing core/shell binders. The present application is directed to a specific class of such core/shell polymers for use in dispersing magnetic powders in ink-jet printing inks.

TECHNICAL FIELD

The present invention relates generally to ink-jet printing ink compositions having magnetic properties and, more particularly, to the use of core/shell and other polymers, or binders, with hydrophobic and hydrophilic portions that contribute to dispersing magnetic powders, along with water-insoluble colorants, in the ink and that form a protective film upon drying of the ink.

BACKGROUND ART

Core/shell polymers are well-known; such polymers typically have a hydrophilic portion and a hydrophobic portion comprising a latex particle morphology consisting of an inner "core", surrounded by an outer "shell". Core/shell polymers are commonly used to disperse molecules or particles, such as pigments, which are ordinarily insoluble in water, but which, after association with the core/shell polymer, form stable dispersions in water. Dispersion occurs when the hydrophobic portion of the polymer associates with the water-insoluble molecule or particle, and the hydrophilic portion of the polymer disperses with water.

U.S. Pat. No. 4,597,794 discloses the dispersion of pigments in an aqueous vehicle, using aqueous binders comprising both hydrophilic and hydrophobic components. The dispersion of the pigment is followed by centrifugation to eliminate the nondispersed components such as agglomerates. Examples of the hydrophilic component comprise polymers of monomers having a mainly additively polymerizable vinyl group, into which hydrophilic construction portions such as carboxylic acid groups, sulfonic acid groups, sulfate groups, etc. are introduced by using a predetermined amount of an $\alpha,\beta$-unsaturated monomer such as acrylic acid, methacrylic acid, crotonic acid, itaconic acid, itaconic acid monoester, maleic acid, maleic acid monoester, fumaric acid, fumaric acid monoester, vinyl sulfonic acid, sulfoethyl methacrylate, sulfopropyl methacrylate, sulfonated vinylnaphthalene, etc. Examples of the hydrophobic portion comprise polymers of monomers selected from the group consisting of styrene, styrene derivatives, vinylnaphthalene, vinylnaphthalene derivatives, and $\alpha,\beta$-ethylenic unsaturated carboxylate of aliphatic alcohol having $C_8$–$C_{18}$. In addition to the foregoing monomers, also included are acrylonitrile, vinylidene chloride, $\alpha,\beta$-ethylenic unsaturated carboxylate, vinyl acetate, vinyl chloride, acrylamide, methacrylamide, hydroxyethyl methacrylate, hydroxypropyl methacrylate, glycidyl methacrylate, N-methylol acrylamide, N-butoxymethyl acrylamide, etc.

U.S. Pat. No. 5,082,757 discloses encapsulated toner compositions comprising a core and a hydroxylated polyurethane microcapsule shell derived from the polycondensation of a polyisocyanate and a water soluble carbohydrate. The core comprises a polymer binder, pigment, dye, or mixtures thereof Examples of the polymer binder include polymerized monomers selected from the group consisting of acrylates, methacrylates, and olefins including styrene and its derivatives.

U.S. Pat. No. 5,461,125 discloses waterbone core-shell latex polymers useful as adhesive films, rather than super-dispersion stability. The core comprises a (co)polymer comprising a (meth)acrylate ester, while the shell comprises a copolymer, the copolymer comprising (1) a nitrogen-bearing ethylenically-unsaturated free-radically polymerizable monomer, (2) at least one (meth)acrylate ester of about a $C_1$ to $C_4$ alcohol, and (3) an optional ethylenically-unsaturated free-radically polymerizable silane monomer, wherein the nitrogen-bearing ethylenically-unsaturated free-radically polymerizable monomer comprises about 15 to 60 wt % of the shell and wherein the core comprises about 40 to 85 wt % of the weight of the total core-shell latex particle. The polymers obtained by practicing the teachings of the disclosure have molecular weights of 400,000 or more, and the total low $T_g$ component (less than $-10°$ C.), where $T_g$ is the glass transition temperature, is greater than 60 wt %.

U.S. Pat. No. 5,656,071 discloses ink compositions useful for ink-jet applications. These compositions include an insoluble pigment and a polymeric dispersant. In one embodiment, the polymeric dispersant comprises block or graft copolymers comprising a hydrophilic polymeric segment (particularly an acrylate or methacrylate copolymer) and a hydrophobic polymeric segment which includes a hydrolytically stable siloxyl substituent.

Heretofore, ink-jet printers have not had printing performance and durable print properties of competitive printer technologies. The foregoing cited patents do not provide for useful, durable film-forming properties upon removal of the water or solvent. Film durability includes wet and dry rub resistance, highlighter smearfastness, lightfastness, and waterfastness (e.g., hot and cold water, under spill, soak, and rub conditions).

In particular, formulating an ink-jet ink often involves compromising competing interests. For example, it is possible to enhance one property, such as durable film-forming of the colorant. However, such enhancement usually results in the degradation of another property, such as printing stability associated in thermal ink-jet with resistor fouling or nozzle clogging (kogation or decap-nozzle crusting).

Many thermal ink-jet inks exhibit poor smearfastness due to the aqueous solubility of the colorant and/or the dispersibility of the colorant. Efforts continue to develop ink-jet printing ink compositions that evidence the level of smearfastness that a water-insoluble colorant, such as a pigment, possesses, while retaining other desirable printing characteristics.

Further, there is a desire to provide smearfast inks which also possess magnetic properties. Such magnetic inks are useful in applications for electronic input, secure printing for security purposes, and check printing, for example. Such magnetic printing inks must have a fast response to a magnetic field (magnetic stimulation sensitivity) and be incorporated in a permanent ink, for example.

Competing technologies employ magnetic inks. For example, MICR (magnetic ink characterization recording) toner for bar code printing and magnetic lithographic ink are two such inks.

A problem encountered with the formulation of magnetic inks is the poor dispersion stability of magnetic powders; for example, ferrites in aqueous systems tend to settle out due to their heavy density. Ultra-small particles (several hundred Angstrom) in dry form are hard to use due to aerosol properties, while in wet form evidence poor waterfastness and poor print permanency. Further, most magnetic powders exhibit a low density white or brown color, which does not provide good print contrast.

Thus, there is a need to provide an ink having magnetic properties in which the magnetic component is dispersible and in which the ink is smearfast, waterfast, has high print permanency, and evidences good print contrast.

DISCLOSURE OF INVENTION

In accordance with the invention, specific core-shell binders and certain magnetic additives for use in ink-jet printing ink compositions are provided. The specific core/shell binders have the general formula (I)

$$[(A)_m(B)_n(C)_p(D)_q(E)_r]_x \tag{I}$$

wherein A, B, C, D, and E represent functionalities as follows:

A=at least one hydrophobic component contributing to improved durable, film-forming properties selected from moieties which, when homopolymerized to a solid state, have a glass transition temperature ($T_g$) in the range between −150° and +25° C.;

B=at least one hydrophobic and solvent barrier moiety used to adjust the $T_g$ of the hydrophobic component of the polymer (I) which, when homopolymerized to a solid state, has a $T_g$ greater than +25° C.;

C=at least one hydrophilic component, selected from a wide variety of water-soluble monomers (optional);

D=at least one UV absorber (optional);

E=a moiety having at least one highly polar functional group (optional);

m=5 to 95 wt %;
n=5 to 95 wt %;
p=0 to 60 wt %;
q=0 to 50wt %;
r=0 to 30 wt %;
m+n+p+q+r=100 wt %; and
x=1 to 100,000, with the proviso that at least one of C and E must be present.

The molecular weight (weight average) of polymer (1) is between about 1,000 and 2,000,000.

The polymers useful in the practice of the invention are prepared by emulsifying the monomers and then conducting a free-radical polymerization in water.

The magnetic additives employed in the practice of the present invention include magnetic powders, such as the alloys containing iron, cobalt, and/or nickel, oxides of iron, cobalt, and/or nickel, as well as organic compounds containing iron, cobalt, and nickel or comprising charge transfer complexes.

The magnetic properties of the ink are enhanced by incorporation of a dispersive magnetic powder into the core/shell binder and colorant system, such as by a milling process or other dispersion process.

The ink formulation of the present invention comprises:
5 to 50 wt % water-miscible solvent;
0.5 to 10 wt % colorant;
0.1 to 10 wt % core/shell polymeric binder;
1 to 30 wt % magnetic additive; and
water.

The core/shell polymer serves to disperse both the colorant and the magnetic additive in the ink. Upon printing, the polymer encapsulates the colorant and the magnetic additive to provide a smearfast, waterfast ink having a high degree of permanence. The resulting ink-jet inks are at least the equivalent of commercial inks such as MICR toner, MICR lithographic printing ink, etc., but are much less expensive than these competing inks.

BRIEF DESCRIPTION OF THE DRAWINGS

The sole FIGURE is a schematic diagram of the film-forming, water-dispersive polymer used in the practice of the present invention.

BEST MODES FOR CARRYING OUT THE INVENTION

Definitions

Figure 1:
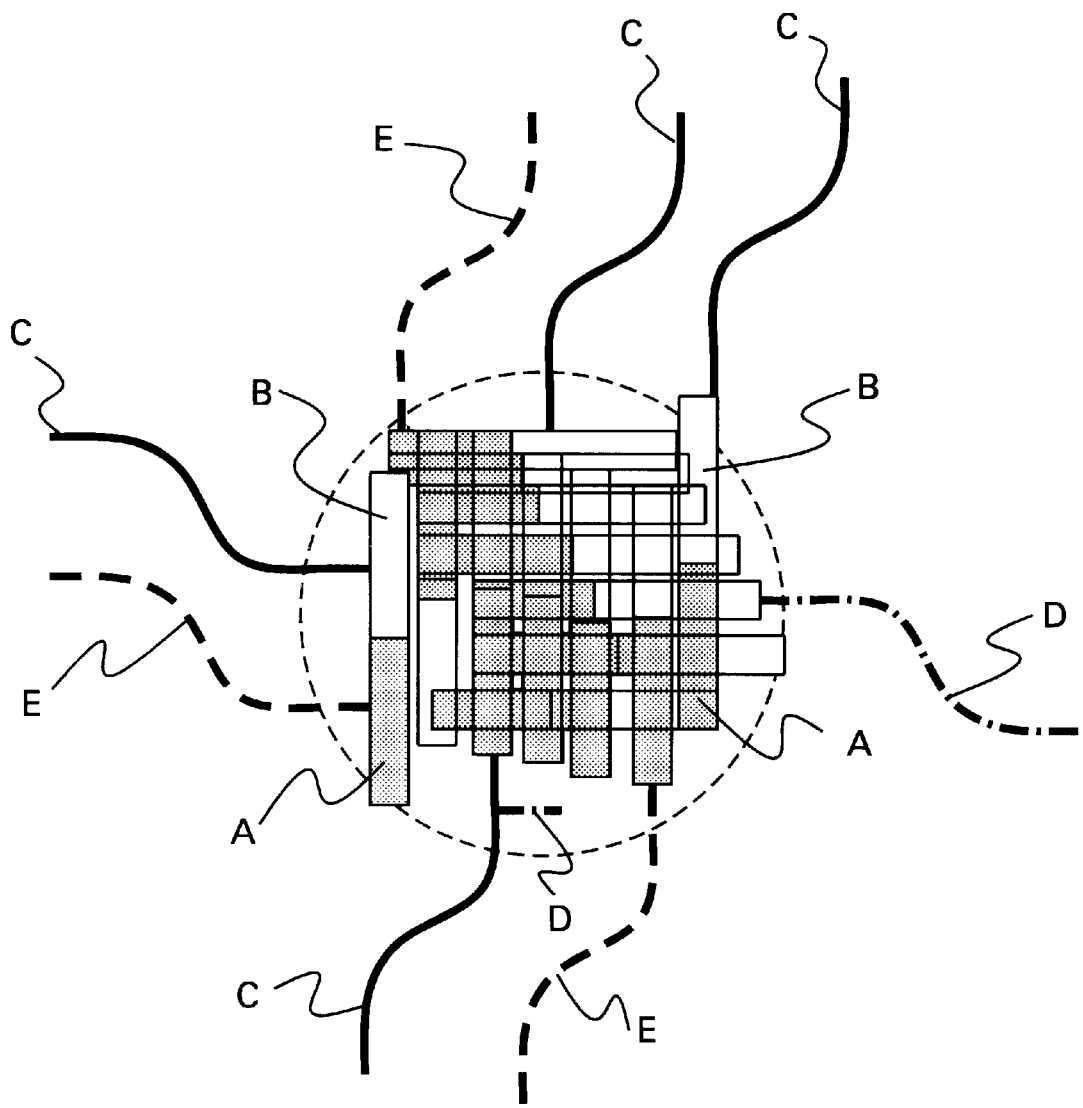

The following definitions are made:

The term "core/shell polymer" means a water-dispersive polymer comprised of a solid hydrophobic core surrounded by (either physically or chemically) a water-soluble shell component, or similar polymers of undefined morphology containing a mixture of hydrophobic and hydrophilic groups.

The term "substituted" is meant to include alcohols (OH), esters (COOR), aldehydes (CHO), carboxylic acids (COOH), thiols (SH), amino groups ($NH_2$, $NHR$, $NR_2$) nitro group ($NO_2$), nitriles (CN), isocyanides (NC), cyanates (CNO), isocyanates (NCO), amido groups, epoxies, halogens, siloxanes, and pyrridinyls. The term "halogen" is meant to include fluorine, chlorine, bromine, and iodine. All concentrations are given in terms of weight percent (wt %), unless otherwise specified. All values of molecular weight of polymers are given in terms of weight average.

Monomeric Moieties

As employed in the present invention, core-shell binders have the following general structure given by formula (I)

$$[(A)_m(B)_n(C)_p(D)_q(E)_r]_x \tag{I}$$

wherein A, B, C, D, and E represent functionalities as follows:

A=at least one hydrophobic component contributing to improved durable, film-forming properties selected from moieties which, when homopolymerized to a solid state, have a glass transition temperature ($T_g$) in the range between −150° and +25° C., preferably −100° to +10° C., more preferably from −60° to 0° C.;

B=at least one hydrophobic and solvent barrier moiety used to adjust the $T_g$ of the hydrophobic component of the polymer (I) which, when homopolymerized to a solid state, has a $T_g$ greater than +25° C.;

C=at least one hydrophilic component, selected from a wide variety of water-soluble monomers (optional);

D=at least one UV absorber (optional);

E=a moiety having at least one highly polar functional group (optional);

m=5 to 95 wt %, preferably 10 to 60 wt %, and more preferably 15 to 50 wt %;

n=5 to 95 wt %, preferably 10 to 60 wt %, and more preferably 15 to 50 wt %;

p=0 to 60 wt %, preferably 10 to 50 wt %, and more preferably 10 to 30 wt %;

q=0 to 50 wt %, preferably 0 to 40 wt %, and more preferably 0.5 to 10 wt %;

r=0 to 30 wt %, preferably 0 to 20 wt %, and more preferably 0 to 10 wt %;

m+n+p+q+r=100 wt %; and x=1 to 100,000, preferably 10 to 10,000, and more preferably 100 to 1,000, with the proviso that at least one of C and E must be present.

Preferably, the core/shell polymer has the structure given by formula (I')

$$A_x B_y C'_z \quad (I')$$

where A and B, are as defined above, C' is either C or E or both C and E, x>40 wt %, y<30wt %, and z<30wt %.

Preferably, the final $T_g$ of the polymer(s) (I) or (I') is within the range of about −25° to +110° C., and more preferably, the final $T_g$ is within the range of about −15° to +90° C., and most preferably within the range of about −10° to +75° C.

The molecular weight (weight average) of polymer (I) or (I') is between about 1,000 and 2,000,000, preferably between about 5,000 and 500,000, and most preferably between about 10,000 and 70,000.

The polymer (I) or (I') is designed to have both hydrophobic and hydrophilic moieties. Thus, the polymer is both (1) water-dispersible, and includes water-soluble polar groups, which are present in sufficient quantity to suspend a pigment particle, and (2) hydrophobic, with a substantial fraction of the polymer containing hydrophobic moieties that are either highly water-resistant or even water-insoluble. The polymer (I) or (I') may be a single composition or a mixture or blend of two or more compositions.

The hydrophobic A moiety allows the polymer to have a sufficiently low $T_g$ to permit formation of a film with other polymer molecules containing the A moiety. The film formation results upon drying (removal of water).

The hydrophobic B moiety in combination with the hydrophobic A moiety provides the polymer with resistance to environmental solvents, such as water and those found in highlighter pens. Additional environmental solvents can be found in rain, coffee, soda pop, body oils, soils, hot water, etc.

The hydrophilic C moiety may be provided in the polymer itself, as shown in formula (I). At least one C moiety may be present, and is water-soluble. If present, such water-soluble moieties comprise an ionic or non-ionic shell of the core-shell polymer. Alternatively, the C moiety may be provided by one or more surfactants, to form a polymer/surfactant system. Any of the ionic (anionic and cationic), non-ionic, and zwitterionic (amphoteric) surfactants may be employed. A representative listing of applicable surfactant can be found in McCutcheon's Emulsifiers and Detergents, North American Edition, 1997, McCutcheon's Division, MC Publishing Co. 175 Rock road, Glen Rock, N.J. 07452 USA Examples of surfactants that may be beneficially employed in the practice of the present invention include: TERGITOLs, which are polyethylene or polypropylene oxide ethers; alkyl phenyl polyethylene oxides available under the tradename TRITONs,; BRIJs, which are polyethylene or polypropylene oxide ethers; PLURONICs, which are also polyethylene/o polypropylene oxide copolymers from BASF; and the SURFYNOLs, which are acetylenic ethoxylated diols; polyethylene oxide (POE) esters; POE diesters; POE amines; protonated POE amines; POE amides; the polypropylene analogs of the foregoing POE compounds; dimethicone copolyols; quaternary ammonium compounds; AEROSOLS, including sulfosuccinates; ethoxylates, amine oxides, and betaines.

Preferred examples of non-ionic surfactants include, but are not limited to, BRIJs, which are polyethylene oxide ethers, available from ICI Surfactants (specific examples include the following BRIJs: 30, 35, 52, 56, 58, 72, 76, 78, 92, 97, and 98); TWEENs, which are derivatives of polyethylene oxides, available from ICI Surfactants (specific examples include the following TWEENs: 20, 40, 60, 80, and 85); SOLSPERSE 27,000, which is an aromatic ethoxylate, available from Zeneca; SPAN 85, which is available from Air Products; and SURFYNOLs, which are acetylenic ethylene oxides available from Air Products. Examples of anionic surfactants include AEROSOL DPOS 45, which is a sulfate, available from Cytec Industries; sodium octadecyl sulfonate; dioctyl ester of sodium sulfosuccinic acid; AEROSOL OT 100%, which is a sulfate, available from American Cyanamid; and sodium lauryl sulfonate. The preferred surfactants include SURFYNOL 465 and SOLSPERSE 27,000.

If used, the amount of surfactant ranges from about 0.001 to 30 wt %, and the balance the polymer.

Optionally, one or more UV absorber moieties D may be present. The UV absorber contains a UV blocking chromophore, which imparts lightfastness to the polymer.

Also optionally, one or more ionic water-soluble, dispersible moieties E may be present. If present, such water-soluble moieties comprise an ionic shell of the core-shell polymer.

Although the C and E moieties are indicated as being optional, at least one of these two moieties must be present in the polymer.

One moiety (monomer) may be employed to provide one or more of the foregoing functions. Alternatively, one function may be provided by one or more of the foregoing moieties. However, in many instances, a single moiety provides a single function.

Typically, the polymer(s) of the present invention is prepared by emulsifying the monomeric components, and then conducting a free-radical polymerization in water. Free-radical polymerization involves employing a free-radical initiator. A concentration of about 0.001 to 10 wt % of the initiator is employed in the total monomer system. Examples of suitable free-radical initiators include, but are not limited to, ammonium persulfate, potassium persulfate, hydrogen peroxide, benzoyl peroxide, azobisisobutyronitrile, TRIGONOX 21, and PERKADOX 16. Preferably, the resulting polymer (I) is a random polymer.

Two or more moieties (monomers) may be copolymerized. Alternatively, two or more polymers may be blended together.

One skilled in this art would understand that the polymer (s) can also be prepared by conventional condensation techniques. Once a film is formed from the polymer and water is removed, as by dehydration under ambient conditions, the film is essentially impervious to water, and the polymer is not capable of being redispersed with water. If the polymer or polymer/surfactant system is associated with pigment particles, and the pigment with polymer or polymer/surfactant system is deposited on a surface, such as paper, then the pigment particles are trapped within or beneath the film on the surface, and are thus protected from the effects of water and environmental solvents.

The sole FIGURE illustrates a molecule of polymer (I). Moieties A and B form a solid core. The C moiety forms a non-ionic, water-soluble shell. The D moiety is a UV absorber. The E moiety forms an ionic, water-soluble or water-insoluble shell.

As stated above, the A moiety is a hydrophobic component for controlling solubility in organic solvents selected from monomer(s) that form homopolymers having a $T_g$ in the range between −150° and +25° C. The A moiety is preferably selected from ethylenically-substituted compounds given by (A):

$$CR_1R_2\text{=}C(R_3)R_4R_5R_6 \quad (A)$$

where $R_1$ and $R_2$ are independently hydrogen, halogen, alkyl, aryl, or substituted alkyl or aryl, or vinyl butyral, $R_3$ is hydrogen, halogen, saturated or unsaturated alkyl, alkoxy, aryl, or substituted alkyl, alkoxy, or aryl, $R_4$ is direct bond, O, CO, NH, halogen, saturated or unsaturated alkyl, aryl, or substituted alkyl, aryl, or CN, $R_5$ is absent (if $R_4$ is alkyl, aryl, or substituted alkyl or aryl), direct bond, hydrogen, NH, O, alkyl, alkylene, aryl, or substituted alkyl, alkylene, or aryl, and $R_6$ is absent (if $R_4$ is alkyl, aryl, or substituted alkyl or aryl or if $R_5$ is hydrogen, alkyl, aryl, or substituted alkyl or aryl), $NH_2$, saturated or unsaturated alkyl, alkoxy, aryl, aroxy, or substituted alkyl or aryl. The alkyl, alkoxy, allkylene, and aryl chains each contain more than one carbon atom and less than 40 carbon atoms. Preferably, the $R_4$ functionality is an electron acceptor moiety.

One preferred embodiment of formula (A) is the following general structure (A1):

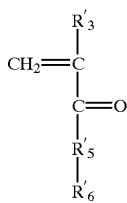

(A1)

where $R'_3$=H, halogen, alkyl, aryl or substituted alkyl or aryl;

$R'_5$=direct bond, O, or NH; and $R'_6$=alkyl, substituted alkyl, alkylaryl or substituted alkylaryl and aralkyl in which the length of alkyl, alkylaryl or aralkyl chain is given as the number of C atoms between 2 and 40; and alkyl or aryl siloxanes.

Examples for structure (A1) include, but are not limited to:

(A1-1) ethyl acrylate;
(A1-2) ethyl methacrylate;
(A1-3) benzyl acrylate;
(A1-4) benzyl methacrylate;
(A1-5) propyl acrylate;
(A1-6) propyl methacrylate;
(A1-7) iso-propyl acrylate;
(A1-8) iso-propyl methacrylate;
(A1-9) butyl acrylate;
(A1-10) butyl methacrylate;
(A1-11) hexyl acrylate;
(A1-12) hexyl methacrylate;
(A1-13) octadecyl methacrylate;
(A1-14) octadecyl acrylate;
(A1-15) lauryl methacrylate;
(A1-16) lauryl acrylate;
(A1-17) hydroxyethyl acrylate;
(A1-18) hydroxyethyl methacrylate;
(A1-19) hydroxyhexyl acrylate;
(A1-20) hydroxyhexyl methacrylate;
(A1-21) hydroxyoctadecyl acrylate;
(A1-22) hydroxyoctadecyl methacrylate;
(A1-23) hydroxylauryl methacrylate;
(A1-24) hydroxylauryl acrylate;
(A1-25) phenethyl acrylate;
(A1-26) phenethyl methacrylate;
(A1-27) 6-phenyy hexyl acrylate;
(A1-28) 6-phenylhexyl methacrylate;
(A1-29) phenyllauryl acrylate;
(A1-30) phenyllauryl methacrylate;
(A1-31) 3-nitrophenyl-6-hexyl methacrylate;
(A1-32) 3-nitrophenyl-18-octadecyl acrylate;
(A1-33) ethyleneglycol dicyclopentyl ether acrylate;
(A1-34) vinyl ethyl ketone;
(A1-35) vinyl propyl ketone;
(A1-36) vinyl hexyl ketone;
(A1-37) vinyl octyl ketone;
(A1-38) vinyl butyl ketone;
(A1-39) cyclohexyl acrylate;
(A1-40) 3-methacryloxypropyldimethy1methoxysilane;
(A1-41) 3-methacryloxypropylmethyldimethoxysilane;
(A1-42) 3-methacryloxypropylpentamethyldisiloxane;
(A1-43) 3-methacryloxypropyltris(trimethylsiloxy)silane;
(A1-44) 3-acryloxypropyldimnethylmethoxysilane;
(A1-45) acryloxypropylmethyldimethoxysilane;
(A1-46) trifluoromethyl styrene;
(A1-47) trifluoromethyl acrylate;
(A1-48) trifluoromethyl methacrylate;
(A1-49) tetrafluoropropyl acrylate;
(A1-50) tetrafluoropropyl methacrylate;
(A1-51) heptafluorobutyl methacrylate;
(A1-52) iso-butyl acrylate;
(A1-53) iso-butyl methacrylate;
(A1-54) 2-ethylhexyl acrylate;
(A1-55) 2-ethylhexyl methacrylate;
(A1-56) iso-octyl acrylate; and
(A1-57) iso-octyl methacrylate.

Another preferred embodiment for formula (A) is the following general structure (A2):

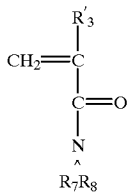

(A2)

where $R'_3$=same definition as that of structure (A1) above; and $R_7$=$R_8$=same or different combinations of $R'_6$ in structure (A1) above.

An example for structure (A2) includes, but is not limited to:

(A2-1) N,N-dihexyl acrylamide; and
(A2-2) N,N-dioctyl acrylamide.

Yet another preferred embodiment for formula (A) is the following general structure (A3):

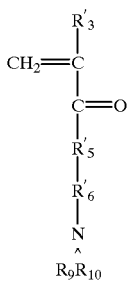

(A3)

where R'₃=same definition as that of structure (A1);

R'₅=same definition as that of structure (A1);

R'₆=alkylene, arylene, substituted alkylene or arylene; and

R₉ and R₁₀ are independently selected from H, alkyl, substituted alkyl, alkylaryl or substituted alkylaryl in which the length of alkyl and alkylaryl chains each comprise between 2 and 40 C atoms. Alternatively, R₉ and R₁₀ together may form a 5- or 6-membered ring.

Examples for structure (A3) include, but are not limited to:

(A3-1) aminoethyl acrylate;
(A3-2) aminopropyl acrylate;
(A3-3) aminopropyl methacrylare;
(A3-4) aminoisopropyl acrylate;
(A3-5) aminoisopropyl methacrylate;
(A3-6) aminobutyl acrylate;
(A3-7) aminobutyl methacrylate;
(A3-8) aminohexyl acrylate;
(A3-9) aminohexyl methacrylate;
(A3-10) aminooctadecyl methacrylate;
(A3-11) aminooctadecyl acrylate;
(A3-12) aminolauryl methacrylate;
(A3-13) aminolauryl acrylate;
(A3-14) N,N-dimethylaminoethyl acrylate;
(A3-15) N,N-dimethylaminoethyl methacrylate;
(A3-16) N,N-diethylaminoethyl acrylate;
(A3-17) N,N-diethylaminoethyl methacrylate; and
(A3-18) piperidino-N-ethyl acrylate.

Still another preferred embodiment for formula (A) is the following general structure (A4):

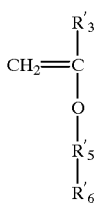

(A4)

where: R'₄=H, halogen, alkyl, aryl, sustituted alkyl or aryl;

R'₄=direct bond, CO, alkylene, arylene, substituted alkylene or arylene; and

R'₆=alkyl, aryl, substituted alkyl or aryl.

Examples for structure (A4) include, but are not limited to:

(A4-1) vinyl propionate;
(A4-2) vinyl acetate;
(A4-3) vinyl butyrate;
(A4-4) vinyl butyl ether; and
(A4-5) vinyl propyl ether.

As stated above, the B moiety is hydrophobic and is a solvent barrier composed of monomer(s) that form homopolymers having a $T_g$ greater than 25° C. The B moiety has the general structure given by formula (B)

$$CR_1R_2=C(R_3)R''_4R''_5R''_6 \qquad (B)$$

where $R_1$ and $R_2$ are independently hydrogen, halogen, or vinyl butyral, $R_3$ is hydrogen, halogen, saturated or unsaturated alkyl, alkoxy, aryl, or substituted alkyl, alkoxy, or aryl, $R''_4$ is direct bond, O, CO, NH, halogen, saturated or unsaturated alkyl, aryl, or substituted alkyl, aryl, or CN, $R''_5$ is absent (if $R_4$ is alkyl, aryl, or substituted alkyl or aryl), direct bond, hydrogen, NH, O, alkyl, alkylene, aryl, or substituted alkyl, alkylene, or aryl, and $R''_6$ is absent (if $R_4$ is alkyl, aryl, or substituted alkyl or aryl or if $R_5$ is hydrogen, alkyl, aryl, or substituted alkyl or aryl), $NH_2$, saturated or unsaturated alkyl, alkoxy, aryl, aroxy, or substituted alkyl or aryl.

The alkyl, alkoxy, alkylene, aryl, aroxy chains each contain from 1 to 40 carbon atoms. Additionally, $R_1$ and $R_2$ and $R_2$ and $R_3$ can each formn a ring; one example of a ring compound so formed includes, but is not limited to, poly-vinyl butyral. Further, $R''_4$ and $R''_5$ can form a ring through either nitrogen or oxygen.

Formula (B) is seen to be substantially the same as formula (A), but with some differences in the substituent groups, which provide a homopolymer of these monomers with the higher $T_g$ of at least 25° C.

One preferred embodiment of formula (B) is the following general structure (B1):

$$CH_2=CR'''_5R'''_6 \qquad (B1)$$

where $R'''_5$=hydrogen, alkyl, alkoxy, aryl or halogen; and $R'''_6$=H, aryl, alkyl (with one carbon atom), amino, ester, epoxy component containing groups, and fluoroalkyl derivatives.

Examples for formula (B 1) include, but are not limited to;

(B1-1) ethylene;
(B1-2) styrene;
(B1-3) vinyl carbazole;
(B1-4) vinyl naphthalalene;
(B1-5) vinyl anthracene;
(B1-6) vinyl pyrene;
(B1-7) methyl methacrylate;
(B1-8) methyl acrylate;
(B1-9) alpha-methyl styrene;
(B1-10) dimethylstyrene;
(B1-11) methylstyrene;
(B1-12) vinylbiphenyl;
(B1-13) glycidyl acrylate;
(B1-14) glycidyl methacrylate;
(B1-15) glycidyl propylene;
(B1-16) 2-methyl-2-vinyl oxirane;
(B1-17) vinyl pyrridine; and
(B1-18) aminoethyl methacrylate; and (B1-19) aminoethylphenyl acrylate.

Another preferred embodiment of formula (B) is the following general structure (B2):

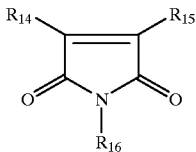
(B2)

where $R_{14}$ and $R_{15}$ are independently selected from H, halogen, alkyl, aryl, substituted alkyl and aryl; alternatively, $R_{14}$ and $R_{15}$ are in the form of a closed ring; and $R_{16}$ is H, halogen, alkyl, aryl, substituted alkyl or aryl, or unsaturated alkyl.

Examples for formula (B2) include, but are not limited to:

(B2-1) maleimide;
(B2-2) N-phenyl maleimide;
(B2-3) N-hexyl maleimide;
(B2-4) N-vinylphthalimide; and
(B2-5) N-vinyl maleimide.

As stated above, the C moiety is a hydrophilic component. The C moiety is selected from a wide variety of monomers such as poly(ethylene glycol) units having general formula (C1), vinyl pyrrolidones having general formula (C2), vinyl imidazoles having general formula (C3) and acrylamides having general formula (C4), all of which polymerize to form water-soluble polymers.

The general structure of formula (C1) is

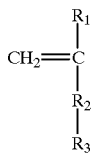
(C1)

where $R_1$=H, halogen, alkyl, aryl, or substituted alkyl or aryl;

$R_2$=direct bond, O, CO, NH, or CONH;

$R_3$=OH, $(CH_2CH_2O)_yR_4$, $(CH_2CH(CH_3)O)_yR_4$, or $(CH_2CH(C_2H_5)O)_yR_4$ or the thioether analogs: SH, $(CH_2CH_2S)_yR_4$, $(CH_2CH(CH_3)S)_yR_4$ or $(CH_2CH(C_2H_5)S)_yR_4$;

y=1 to 200; and $R_4$=alkyl, aryl, substituted alkyl or aryl.

Examples for general structure (C1) include, but are not limited to:

(C1-1) poly(ethylene glycol) methyl ether acrylate of average molecular weight 404;
(C1-2) poly(ethylene glycol) methyl ether methacrylate of average molecular weight 418;
(C1-3) poly(ethylene glycol) methyl ether methacrylate of average molecular weight 2068;
(C1-4) poly(ethylene glycol) methyl ether acrylate of average molecular weight 2054; and
(C1-5) polyvinyl alcohol.

The general structure of formula (C2) is

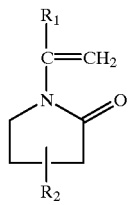
(C2)

where $R_1$ and $R_2$ are independently selected from —H, halogen, alkyl, aryl, and substituted alkyl and aryl.

Examples for general structure (C2) include, but are not limited to:

(C2-1) vinyl pyrrolidone;
(C2-2) vinyl 4-methylpyrrolidone; and
(C2-3) vinyl 4-phenylpyrrolidone.

The general structure of formula (C3) is

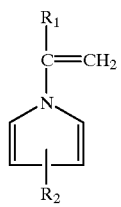
(C3)

where $R_1$ and $R_2$ are independently selected from H, halogen, alkyl, aryl, and substituted alkyl and aryl.

Examples for general structure (C3) include, but are not limited to:

(C3-1) vinyl imidazole;
(C3-2) vinyl 4-methylimidazole; and
(C3-3) vinyl 4-phenylimidazole.

The general structure of formula (C4) is

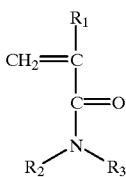
(C4)

where $R_1$ is H, halogen, alkyl, aryl or substituted alkyl or aryl; and $R_2$ and $R_3$ are independently selected from H, alkyl, aryl and substituted alkyl and aryl; alternatively, $R_2$ and $R_3$ can form a ring, either aliphatic or aromatic.

Examples for the general structure (C4) include, but are not limited to:

(C4-1) acrylamide;
(C4-2) methacrylamide;
(C4-3) N,N-dimethyl acrylamide;
(C4-4) N-methyl acrylamide;
(C4-5) N-methyl methacrylamide;
(C4-6) aryloxy piperidine; and
(C4-7) N,N-diethyl acrylamide.

As stated above, the D moiety is a UV absorber composed of monomer(s) having the general structure of formula (D)

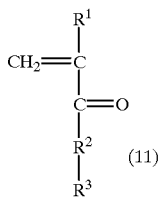

$R^1$ = H, Alkyl, aryl, substituted alkyl or aryl
$R^2$ = O or NH
$R^3$ =

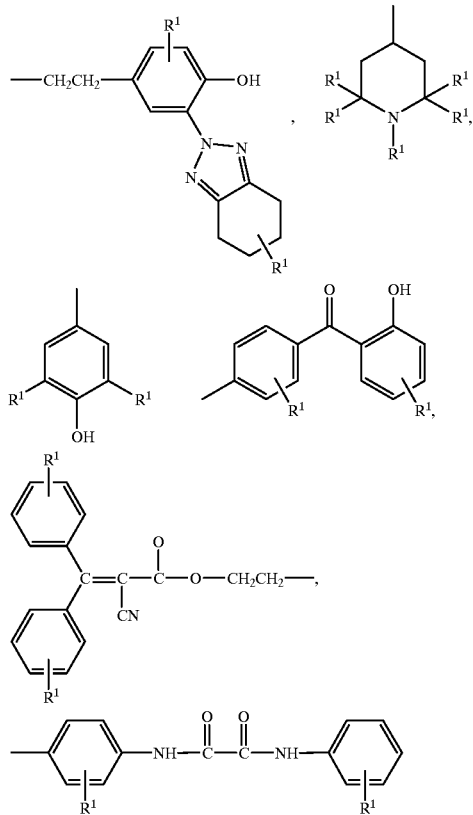

As stated above, the E moiety is a highly polar functional group composed of moieties having the general structure given by formulae (E1) to (E10).

The general structure of formnula (E1) is $$CH(R_1)=C(R_2)R_3COOH \tag{E1}$$

where $R_1$=H, COOH, COOR,;

$R_2$=H, halogen, alkyl, aryl, alkoxyl, or substituted alkyl, aryl or alkoxyl;

$R_3$=direct bond, alkylene, arylene or sustituted alkylene or arylene; and $R_4$=alkyl, aryl, substituted alkyl or aryl.

Examples for structure (E1) include, but are not limited to:

(E1-1) acrylic acid;
(E1-2) methacrylic acid;
(E1-3) chloromethacrylic acid;
(E1-4) maleic acid; and
(E1-5) vinyl benzoic acid.

The general structure of formula (E2) is $$CH_2=CHR_1NR_2R_3 \tag{E2}$$

where $R_1$=alkylene, arylene, substituted alkylene, arylene, or $-SO_2$; and $R_2$ and $R_3$ are independently selected from H, alkyl, aryl, or substituted alkyl, aryl or alkoxyl; alternatively, $R_2$ and $R_3$ can be combined to form a ring, either aliphatic or aromatic.

Examples for structure (E2) include, but are not limited to:

(E2-1) allylamine;
(E2-2) N,N-diethylallylamine; and
(E2-3) vinyl sulfonamide.

The general structure of formula (E3) is $$y(CH_2=CHR_1COO^-)M^{y+} \tag{E3}$$

where $R_1$=alkylene, arylene, substituted alkylene or arylene; y=1 to 4; and $M^{y+}$=$NH_4^+$, $Li^+$, $Na^+$, $K^+$, $Ca^{2+}$, $Mg^{2+}$, $Al^{3+}$, $Ti^{4+}$, triethylammonium, diethylammonium, pyrridinium, etc.

Examples for structure (E3) include, but are not limited to:

(E3-1) sodium acrylate;
(E3-2) sodium methacrylate;
(E3-3) ammonium acrylate; and
(E3-4) ammonium methacrylate.

The general structure of formula (E4) is

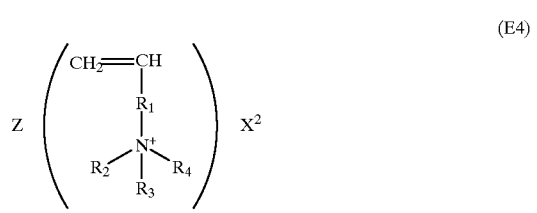

where $R_1$=alkylene, arylene, substituted alkylene or arylene, COO, or cyclic ring containing nitrogen;

$R_2$, $R_3$, and $R_4$ are independently selected from H, alkyl, aryl, alkoxyl, or substituted alkyl, aryl or alkoxyl;

z=1 to 4; and

X=halogen, $BF_4$, $PF_6$, $ClO_4$, SCN, CNO, CNS.

Examples for general structure (E4) include, but are not limited to:

(E4-1) acrylamidopropanetriethylammonium chloride;
(E4-2) methacrylamidopropanetriethylammonium chloride; and
(E4-3) vinylpyridine hydrochloride.

The general structure of formula (E5) is

where $R_1$=H, alkyl, aryl, alkoxyl, substituted alkyl, aryl or alkoxyl;

$R_2$=direct bond, alkylene, arylene or substituted alkylene or arylene;

z=1 to 4; and $M^{z+}$=$NH_4^+$, $Li^+$, $Na^+$, $K^+$, $Ca^{2+}$, $Mg^{2+}$, $Al^{3+}$, $Ti^{4+}$, triethylammonium, diethylammonium, pyrridinium, etc.

Examples for the general structure (E5) include, but are not limited to:

(E5-1) sodium vinyl phosphonate; and (E5-2) sodium 1-methylvinylphosphonate.

The general structure of formula (E6) is

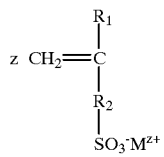
(E6)

where $R_1$=H, alkyl, aryl, alkoxyl, substituted alkyl, aryl or alkoxyl;

$R_2$=direct bond, —$COOR_3$, arylene, alkylene, or —$CONHR_3$;

$R_3$=alkylene, arylene, substituted alkylene or arylene, or fluoroalkylene;

z=1 to 4; and $M^{z+}$=$NH_4^+$, $Li^+$, $Na^+$, $K^+$, $Ca^{2+}$, $Mg^2$+, $Al^{3+}$, $Ti^{4+}$, etc.

Examples for the general structure (E6) include, but are not limited to:

(E6-1) sodium vinyl sulfonate;

(E6-2) sodium 1-methylvinylsulfonate;

(E6-3) sodium styrenesulfonate;

(E6-4) sodium acrylamidopropanesulfonate;

(E6-5) sodium methacrylamidopropanesulfonate; and (E6-6) sodium vinyl morpholine sulfonate.

Additional E moieties include the following salts:

(E7) sulfonium salts;

(E8) carbonium salts;

(E9) pyrrilinium salt and thio pyrrilinium salt; and (E10) tetrazolium salt.

The sulfonium salts have the following structure (E7):

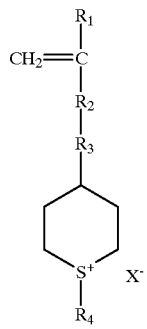
(E7)

where $R_1$=H, halogen, alkyl, or aryl;

$R_2$=CO, O;

$R_3$=direct bond, NH;

$R_4$=alkyl or aryl; and

X=Cl, Br, $BF_4$, $ClO_4$, I, or $NO_3$.

The carbonium salts have the following structure (E8):

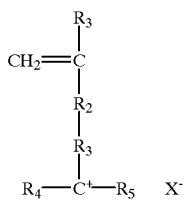
(E8)

where $R_1$=H, halogen, alkyl, or aryl;

$R_2$=CO, O;

$R_3$=direct bond, NH, alkylene, or arylene;

$R_4$ and $R_5$ are independently selected from alkyl or aryl; and

X=$SbF_5^-$;$FSO_3^-$.

The pyrrilinium and thiopyrrilinium salts have the following structure (E9):

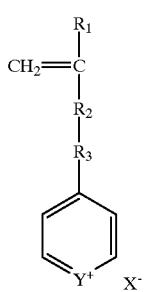
(E9)

where Y=O or S;

$R_1$=H, halogen, alkyl, or aryl;

$R_2$=CO, O;

$R_3$=direct bond, NH, alkylene, or arylene;

X=Cl, Br, I, $ClO_4$, $BF_4$, etc.

Polymers

Polymers that fall within the scope of the formula (I) include, but are not limited to, the following examples, which may be characterized as A-B-C or A-B-C-D polymers:

(1) (hexyl acrylate)$_{40}$ (methyl methacrylate)$_{40}$ (poly(ethylene glycol) methyl ether acrylate, mw=404)$_{20}$ (2) (hexyl acrylate)$_{30}$ (methyl methacrylate)$_{50}$ (poly(ethylene glycol) methyl ether acrylate, mw=404)$_{20}$ (3) (hexyl acrylate)$_{20}$ (methyl methacrylate)$_{60}$ (poly(ethylene glycol) methyl ether acrylate, mw=404)$_{20}$ (4) (hexyl acrylate)$_{40}$ (methyl methacrylate)$_{40}$ (poly(ethylene glycol) methyl ether acrylate, mw=2054)$_{20}$ (5) (hexyl acrylate)$_{30}$ (methyl methacrylate)$_{50}$ (poly(ethylene glycol) methyl ether acrylate, mw=2054)$_{20}$ (6) (hexyl acrylate)$_{20}$ (methyl methacrylate)60 (poly(ethylene glycol) methyl ether acrylate, mw=2054)$_{20}$ (7) (hexyl acrylate)$_{40}$ (methyl methacrylate)$_{40}$ (poly(ethylene glycol) methyl ether acrylate, mw=218)$_{20}$ (8) (hexyl acrylate)$_{30}$ (methyl methacrylate)$_{50}$ (poly(ethylene glycol) methyl ether acrylate, mw=218)$_{20}$ (9) (hexyl acrylate)$_{20}$ (methyl methacrylate)$_{60}$ (poly(ethylene glycol) methyl ether acrylate, mw=218)$_{20}$

(10) (ethyl acrylate)$_{40}$ (methyl methacrylate)$_{40}$ (poly(ethylene glycol) methyl ether acrylate, mw=404)$_{20}$

(11) (propyl acrylate)$_{40}$ (methyl methacrylate)$_{40}$ (poly(ethylene glycol) methyl ether acrylate, mw=404)$_{20}$
(12) (butyl acrylate)$_{40}$ (methyl methacrylate)$_{40}$ (poly(ethylene glycol) methyl ether acrylate, mw=404)$_{20}$
(13) (octadecyl acrylate)$_{40}$ (methyl methacrylate)$_{40}$ (oly(ethylene glycol) methyl ether acrylate, mw=404)$_{20}$
(14) (lauryl methacrylate)$_{40}$ (methyl methacrylate)$_{40}$ (poly(ethylene glycol) methyl ether acrylate, mw=404)$_{20}$
(15) (octadecyl methacrylate)40 (methyl methacrylate)$_{40}$ (poly(ethylene glycol) methyl ether acrylate, mw=404)$_{20}$
(16) (hydroxyoctadecyl acrylate)$_{40}$ (methyl methacrylate)$_{40}$ (poly(ethylene glycol) methyl ether acrylate, mw=404)$_{20}$
(17) (hydroxyethyl acrylate)$_{40}$ (methyl methacrylate)$_{40}$ (poly(ethylene glycol) methyl ether acrylate, mw=404)$_{20}$
(18) (hydroxylauryl methacrylate)$_{40}$ (methyl methacrylate)$_{40}$ (poly(ethylene glycol) methyl ether acrylate, mw=404)$_{20}$
(19) (phenethyl acrylate)$_{40}$ (methyl methacrylate)$_{40}$ (poly(ethylene glycol) methyl ether acrylate, mw=404)$_{20}$
(20) (6-phenylhexyl acrylate)$_{40}$ (methyl methacrylate)$_{40}$ (poly(ethylene glycol) methyl ether acrylate, mw=404)$_{20}$
(21) (cyclohexyl acrylate)$_{40}$ (methyl methacrylate)$_{40}$ (poly(ethylene glycol) methyl ether acrylate, mw=404)$_{20}$
(22) (acryloxypropylmethyldimethoxysilane)$_{30}$ (methyl methacrylate)$_{50}$ (poly(ethylene glycol) methyl ether acrylate, mw=404)$_{20}$
(23) (N,N-dihexyl acrylamide)$_{20}$ (methyl methacrylate)$_{60}$ (poly(ethylene glycol) methyl ether acrylate, mw=404)$_{20}$
(24) (aminopropyl acrylate)$_{40}$ (methyl methacrylate)$_{40}$ (poly(ethylene glycol) methyl ether acrylate, mw=2054)$_{20}$
(25) (aminohexyl acrylate)$_{30}$ (methyl methacrylate)$_{50}$ (poly(ethylene glycol) methyl ether acrylate, mw=2054)$_{20}$
(26) (aminolauryl methacrylate)$_{20}$ (methyl methacrylate)$_{60}$ (poly(ethylene glycol) methyl ether acrylate, mw=2054)$_{20}$
(27) (N,N-dimethylaminoethyl acrylate)$_{40}$ (methyl methacrylate)$_{40}$ (poly(ethylene glycol) methyl ether acrylate, mw=218)$_{20}$
(28) (vinyl acetate)$_{30}$ (methyl methacrylate)$_{50}$ (poly(ethylene glycol) methyl ether acrylate, mw=218)$_{20}$
(29) (vinyl butyl ether)$_{20}$ (methyl methacrylate)$_{60}$ (poly(ethylene glycol) methyl ether acrylate, mw=218)$_{20}$
(30) (hexyl acrylate)$_{40}$ (styrene)$_{40}$ (poly(ethylenie glycol) methyl ether acrylate, mw=404)$_{20}$
(31) (hexyl acrylate)$_{30}$ (dimethyl styrene)$_{50}$ (poly(ethylene glycol) methyl ether acrylate, mw=404)$_{20}$
(32) (hexyl acrylate)$_{20}$ (trifluoromethyl styrene)$_{60}$ (poly(ethylene glycol) methyl ether acrylate, mw=404)$_{20}$
(33) (hexyl acrylate)$_{40}$ (tetrafluoropropyl methacrylate)$_{40}$ (poly(ethylene glycol) methyl ether acrylate, mw=2054)$_{20}$
(34) (hexyl acrylate)$_{30}$ (glycidyl methacrylate)$_{50}$ (poly(ethylene glycol) methyl ether acrylate, mw=2054)$_{20}$
(35) (hexyl acrylate)$_{20}$ (glycidyl acrylate)$_{60}$ (poly(ethylene glycol) methyl ether acrylate, mw=2054)$_{20}$
(36) (hexyl acrylate)$_{40}$ (maleimide)$_{40}$ (poly(ethylene glycol) methyl ether acrylate, mw=218)$_{20}$
(37) (hexyl acrylate)$_{50}$ (n-hexyl maleimide)$_{30}$ (poly(ethylene glycol) methyl ether acrylate, mw=218)$_{20}$
(38) (hexyl acrylate)$_{40}$ (n-vinyl maleimide)$_{40}$ (poly(ethylene glycol) methyl ether acrylate, mw=218)$_{20}$
(39) (hexyl acrylate)$_{40}$ (methyl methacrylate)$_{40}$ (vinyl pyrrolidone)$_{20}$
(40) (hexyl acrylate)$_{40}$ (methyl methacrylate)$_{40}$ (vinyl 4-methylpyrrolidone)$_{20}$
(41) (hexyl acrylate) (methyl methacrylate)$_{40}$ (vinyl imidazole)$_{20}$
(42) (hexyl acrylate)$_{40}$ (methyl methacrylate)$_{40}$ (acrylamide)$_{20}$
(43) (hexyl acrylate)$_{40}$ (methyl methacrylate)$_{40}$ (4-methyl acrylanide)$_{20}$
(44) (hexyl acrylate)$_{40}$ (methyl methacrylate)$_{30}$ (oly(ethylene glycol) methyl ether acrylate, mw=404)$_{20}$(D1)$_{10}$, where, referring to the D moiety, $R^1$=H, $R^2$=O, and $R^3$=D1
(45) (hexyl acrylate)$_{40}$ (methyl methacrylate)$_{30}$ (poly(ethylene glycol) methyl ether acrylate, mw=404)$_{20}$ (D1)$_{10}$, where, referring to the D moiety, $R^1$=H, $R^2$=O, and $R^3$=D1
(46) (hexyl acrylate)$_{40}$ (methyl methacrylate)$_{30}$ (poly(ethylene glycol) methyl ether acrylate, mw=404)$_{20}$ (D1)$_{10}$, where, referring to the D moiety, $R^1$=H, $R^2$=O, and $R^3$=D1
(47) (hexyl acrylate)$_{40}$ (methyl methacrylate)$_{30}$ (poly(ethylene glycol) methyl ether acrylate, mw=404)$_{20}$ (D1)$_{10}$, where, referring to the D moiety, $R^1$=H, $R^2$=O, and $R^3$=D1
(48) (hexyl acrylate)$_{40}$ (methyl methacrylate)$_{30}$ (poly(ethylene glycol) methyl ether acrylate, mw=404)$_{20}$ (D4)$_{10}$, where, referring to the D moiety, $R^1$=H, $R^2$=O, and $R^3$=D4
(49) (hexyl acrylate)$_{40}$ (methyl methacrylate)$_{30}$ (poly(ethylene glycol) methyl ether acrylate, mw=404)$_{20}$ (D4)$_{10}$, where, referring to the D moiety, $R^1$=H, $R^2$=O, and $R^3$=D4
(50) (hexyl acrylate)$_{40}$ (styrene)$_{30}$ (poly(ethylene glycol) methyl ether acrylate, mw=404)$_{20}$(D1)$_{10}$, where, referring to the D moiety, $R^1$=H, $R^2$=O, and $R^3$=D1
(51) (hexyl acrylate)$_{40}$ (styrene)$_{30}$ (vinyl pyrrolidone)$_{20}$ (D1)$_{10}$, where, referring to the D moiety, $R^1$=H, $R^2$=O, and $R^3$=D1
(52) (hexyl acrylate)$_{50}$ (methyl methacrylate)$_{45}$ (poly(ethylene glycol) methyl ether acrylate, mw=404)$_{5}$
(53) (hexyl acrylate)$_{50}$ (methyl methacrylate)$_{40}$ (poly(ethylene glycol) methyl ether acrylate, mw=404)$_{10}$
(54) (hexyl acrylate)$_{50}$ (methyl methacrylate)$_{35}$ (poly(ethylene glycol) methyl ether acrylate, mw=404)$_{15}$ Polymers that fall within the scope of the formula (I) include, but are not limited to, the following examples, which may be characterized as A-B-E polymers:

(55) (hexyl acrylate)$_{40}$ (methyl methacrylate)$_{40}$ (acrylic acid)$_{20}$
(56) (hexyl acrylate)$_{60}$ (methyl methacrylate)$_{20}$ (methacrylic acid)$_{20}$
(57) (hexyl acrylate)$_{40}$ (methyl methacrylate)$_{40}$ (maleic acid)$_{20}$
(58) (hexyl acrylate)$_{40}$ (methyl methacrylate)$_{40}$ (vinyl benzoic acid)$_{20}$

(59) (hexyl acrylate)$_{40}$ (methyl methacrylate)$_{40}$ (vinyl sulfonamide)$_{20}$

(60) (hexyl acrylate)$_{40}$ (methyl methacrylate)$_{40}$ (sodium acrylate)$_{20}$

(61) (hexyl acrylate)$_{40}$ (methyl methacrylate)$_{40}$ (ammonium acrylate)$_{20}$

(62) (hexyl acrylate)$_{40}$ (methyl methacrylate)$_{40}$ (ammonium methacrylate)$_{20}$

(63) (ethyl acrylate)$_{40}$ (methyl methacrylate)$_{40}$ (acrylamidopropanetriethylammonium chloride)$_{20}$

(64) (propyl acrylate)$_{40}$ (methyl methacrylate)$_{40}$ (vinyl pyridine hydrochloride)$_{20}$

(65) (butyl acrylate)$_{40}$ (methyl methacrylate)$_{40}$ (sodium vinyl phosphate)$_{20}$

(66) (hexyl acrylate)$_{40}$ (methyl methacrylate)$_{40}$ (sodium styrene sulfonate)$_{20}$

(67) (hexyl acrylate)$_{30}$ (methyl methacrylate)$_{50}$ (sodium acrylamidopropanesulfonate)$_{20}$

(68) (butyl acrylate)$_{40}$ (methyl methacrylate)$_{40}$ (sodium vinyl phosphate)$_{20}$

(69) (hexyl acrylate)$_{40}$ (methyl methacrylate)$_{40}$ (sodium styrene sulfonate)$_{20}$

(70) (hexyl acrylate)$_{30}$ (methyl methacrylate)$_{50}$ (sodium acrylamidopropanesulfonate)$_{20}$

(71) (styrene)$_{75}$ (acrylic acid)$_{20}$ (D1)$_5$, where, referring to the D moiety, $R_1$=H, $R^2$=O, and $R^3$=D1

(72) (styrene)$_{55}$ (acrylic acid)$_{40}$ (d4)$_5$, where, referring to the D moiety, $R^1$=H, $R^2$=O, and $R^3$=D4

(73) (styrene)$_{40}$ (methyl methacrylate)$_{40}$ (acrylic acid)$_{20}$

(74) (ethyl acrylate)$_{55}$ (acrylic acid)$_{40}$ (D1)$_5$, where, referring to the D moiety, $R^1$=H, $R^2$=O, and $R^3$=D1

(75) (styrene)$_{40}$ (ethyl acrylate)$_{40}$ (acrylic acid)$_{20}$

(76) (methyl methacrylate)$_{40}$ (hexyl acrylate)$_{55}$ (D1)$_5$, where, referring to the D moiety, $R^1$=H, $R^2$=O, and $R^3$=D1

(77) (methyl methacrylate)$_{40}$ (butyl acrylate)$_{55}$ (D11)$_5$, where, referring to the D moiety, $R^1$=H, $R^2$=O, and $R^3$=D1

(78) (styrene)$_{30}$ (octadecyl acrylate)$_{65}$ (D1)$_5$, where, referring to the D moiety, $R^1$=H, $R^2$=O, and $R^3$=D1

(79) (methyl methacrylate)$_{32}$ (hexyl acrylate)$_{46}$ (poly (ethylene glycol) methyl ether acrylate, mw=404)$_{12}$ (acrylic acid)$_{10}$ Inks Any of the commonly employed colorants in ink-jet printing technology may be used in the practice of the present invention. While dyes, whether water-insoluble or water-soluble, may be employed, the core/shell binder is preferably employed with pigments.

Without being limited to theory, it is believed that the primer is associated with the colorant in solution and the primer and durable core/shell polymers are encapsulating the colorants upon drying; this appears to be the case after printing the ink on a print medium, such as paper. However, the present invention is meant to include ink formulations which comprise the polymers and colorants without limit to the type of association between the colorant and the polymer.

The following pigments are useful in the practice of the invention; however, this listing is not intended to limit the invention. The following pigments are available from BASF: Paliogen® Orange, Heliogen® Blue L 6901F, Heliogen® Blue NBD 7010, Heliogen® Blue K 7090, Heliogen® Blue L 7101F, Paliogen® Blue L 6470, Heliogen® Green K 8683, and Heliogen® Green L 9140. The following pigments are available from Cabot: Monarch® 1400, Monarch® 1300, Monarch® 1100, Monarch® 1000, Monarch® 900, Monarch® 880, Monarch® 800, Monarch® 700, Cabojet200, Cabojet300, IJX55, and IJX76. The following pigments are available from Ciba-Geigy: Chromophtal® Yellow 3G, Chromophtal® Yellow GR, Chromophtal® Yellow 8G, Igrazin® Yellow 5GT, Igralite® Rubine 4BL, Monastral® Magenta, Monastral® Scarlet, Monastral® Violet R, Monastral® Red B, and Monastral® Violet Maroon B. The following pigments are available from Columbian: Raven 7000, Raven 5750, Raven 5250, Raven 5000, and Raven 3500. The following pigments are available from Degussa: Color Black FW 200, Color Black FW 2, Color Black FW 2V, Color Black FW 1, Color Black FW 18, Color Black S 160, Color Black S 170, Special Black 6, Special Black 5, Special Black 4A, Special Black 4, Printex U, Printex V, Printex 140U, and Printex 140V. The following pigment is available from DuPont: Tipure® R-101. The following pigments are available from Heubach: Dalamar® Yellow YT-858-D and Heucophthal® Blue G XBT-583D. The following pigments are available from Hoechst: Permanent Yellow GR, Permanent Yellow G, Permanent Yellow DHG, Permanent Yellow NCG-7 1, Permanent Yellow GG, Hansa Yellow RA, Hansa Brilliant Yellow 5GX-02, Hansa Yellow-X, Novoperm® Yellow HR, Novoperm® Yellow FGL, Hansa Brilliant Yellow 10GX, Permanent Yellow G3R-01, Hostaperm® Yellow H4G, Hostaperm®D Yellow H3G, Hostaperm® Orange GR, Hostaperm® Scarlet GO, and Permanent Rubine F6B. The following pigments are available from Mobay: Quindo® Magenta, Indofast® Brilliant Scarlet, Quindo® Red $R_{6700}$, Quindo® Red $R_{6713}$, and Indofast® Violet. The following pigments are available from Sun Chemical: L74-1357 Yellow, L75-1331 Yellow, L75-2577 Yellow, YGD 9374 Yellow, YHD 9123 Yellow, YCD 9296 Yellow, YFD 1100 Yellow, QHD6040 Magenta, QFD1180 Magenta, RFD3217 Magenta, QFD1146 Magenta, RFD9364 Magenta, QFD 9334 Magenta, BCD6105 Cyan, BCD9448 Cyan, BCD6060 Cyan, BFD5002 Cyan, BFD1121 Cyan, and LHD9303 Black. Preferably, a black pigment, such as carbon black, is employed, which acts as a contrast enhancer for the magnetic additive.

Dyes, whether water-soluble or water-insoluble, may be employed in the practice of the present invention, although not as preferred as pigments. Examples of water-soluble dyes include the sulfonate and carboxylate dyes, specifically, those that are commonly employed in ink-jet printing. Specific examples include: Sulforhodamine B (sulfonate), Acid Blue 113 (sulfonate), Acid Blue 29 (sulfonate), Acid Red 4 (sulfonate), Rose Bengal (carboxylate), Acid Yellow 17 (sulfonate), Acid Yellow 29 (sulfonate), Acid Yellow 42 (sulfonate), Acridine Yellow G (sulfonate), Nitro Blue Tetrazolium Chloride Monohydrate or Nitro BT, Rhodamine 6G, Rhodamine 123, Rhodamine B, Rhodamine B Isocyanate, Safranine O, Azure B, Azure B Eosinate, Basic Blue 47, Basic Blue 66, Thioflacin T (Basic Yellow 1), and Auramine 0 (Basic Yellow 2), all available from Aldrich Chemical Company. Examples of water-insoluble dyes include azo, xanthene, methine, polymethine, and anthroquinone dyes. Specific examples of water-insoluble dyes include Ciba-Geigy Orasol Blue GN, Ciba-Geigy Orasol Pink, and Ciba-Geigy Orasol Yellow. Preferably, a black colorant is employed, which acts to enhance the contrast of the magnetic additive. Where the black colorant is a dye, suitable examples include Sudan Black B, Nigrosin, Acid Violet 5, 7, 9, 17, and 19, and process black, which is formed by a suitable blending of cyani, magenta, and yellow dyes. Where the black colorant is a pigment, suitable examples include ionic carbon black, such as IJX products available from Cabot Corporation, or neutral carbon black, such as Monarch, Regal, Black Pearl, and Vulcan, available from Degussa, and treated black for aqueous dispersion, available from Sun Chemical.

In the event that one or more surfactants are employed in place of hydrophilic groups on the smear-fast core/shell polymer, the concentration of such surfactant(s) is in the range of about 0.001 to 10 wt %, preferably about 0.01 to 5 wt %, of the ink.

In accordance with the present invention, in addition to at least one of the foregoing core/shell polymeric binders, the ink-jet printing inks of the present invention include certain additives that impart magnetic properties to the ink. In one embodiment, the oxides of iron, cobalt, and nickel are employed in powder form. The oxides may be single oxides, such as the alpha, beta, and gamma ferrites $Fe_2O_3$ and $Fe_3O_4$ with and without impurities such as FeO and $FeSO_4$, cobalt oxide ($Co_2O_3$), and nickel oxide (NiO), or mixed oxides, such as oxides that contain two or more of iron, cobalt, and nickel and oxides that contain one or more of iron, cobalt, and nickel plus at least one other non-magnetic cation.

Examples of mixed oxides include ferrites with the spinel structure ($MeFe_2O_4$), where Me is a divalent ion of the transition elements Mn, Fe, Co, Ni, Cu, and Zn, or Mg and Cd. Specific examples include $MnFe_2O_4$, $Fe_3O_4$, $CoFe_2O_4$, $NiFe_2O_4$, $CuFe_2O_4$, $ZnFe_2O_4$, and $MgFe_2O_4$. Me can also represent a combination of ions which have an average valency of two, such as $Li^+$ and $Fe^{3+}$ in lithium ferrite, $Li_{0.5}Fe_{2.5}O_4$. The trivalent iron ions (ferric) can be partly replaced by other trivalent ions such as $Al^{3+}$ and $Cr^+$.

Additional examples of mixed oxides include manganites and cobaltites having the perovskite structure and generally represented by the formula $ABO_3$. Magnetic ferrites are found in the following mixed crystal series: $La^{3+}Mn^{3+}O_3$—$Ca^{2+}Mn^{4+}O_3$, $La^{3+}Mn^{3+}O_3$—$Ba^{2+}Mn^{4+}O_3$, $La^{3+}Mn^{3+}O_3$—$Sr^{2+}Mn^{4+}O_3$, and $La^{3+}Co^{3+}O_3$—$SR^{2+}Co^{4+}O_3$.

Further examples of mixed oxides include compositions in the ternary diagram bounded by BaO, MeO, and $Fe_2O_3$, which have a hexagonal crystal structure. Me is as defined above. Specific examples include $BaFe_2O_4$, $BaFe_{12}O_{19}$, $BaZnFe_{17}O_{27}$, $BaNi_2Fe_{16}O_{27}$, $Ba_2Ni_2Fe_{12}O_{22}$, $Ba_3Co_2Fe_{24}O_{41}$, etc.

In addition to oxides of iron, cobalt, and nickel and to mixed oxides of these ions and of, optionally, other cations, powders of metal alloys may be employed, such as neodymium-iron-boron and samarium cobalt. Further, aqueous suspensions of ferrites, such as EMG 308, EMG 508, EMG 408, EMG 807, and EMG 707, available from Ferrofluids, Inc., and Lignosite FML, available from Lignosite, as well as oil suspensions of ferrites, such as EMG 911, available from Ferrofluids, may be used in the practice of the invention.

In addition to the foregoing inorganic magnetic materials, the organic complexes containing iron, cobalt, and/or nickel ions are also advantageously employed in the practice of the present invention. Examples of such organic compounds include iron phthalocyanine and its derivatives, cobalt phthalocyanine, nickel phthalocyanine, ferrocene, cobaltocene, nickelocene, metallo-porphyrins complexed with iron, cobalt, or nickel, hemoglobin, etc. In addition, charge transfer complexes and charge transfer molecules may be used. An example of such charge transfer complexes includes TCNQ/TTL (7,7,8,8-tetracyano-quinodimethane/tetrathiafalvalene). An example of such charge transfer molecules includes quinacridon derivatives.

The above-described magnetic compounds, which are loosely described as ferrimagnetic, but may also include antiferromagnetic compositions, confer magnetic properties on the ink, so that the printed ink may be acted upon by a magnetic field, such as to store information and/or retrieve stored information therein.

The magnetic powders have an average particle size ranging from 100 Angstrom to 1 micrometer. Ideally, a comparatively narrow distribution of particle size is employed.

The concentration of the magnetic additive is within the range of about 1 to 30 wt %, preferably about 3 to 5 wt %, of the ink composition.

In the ink compositions of the present invention, the ratio of colorant (pigment) to binder (1) is between 10:1 and 1:10, preferably between 5:1 and 1:5, and most preferably between 3:1 and 1:3.

The general ink formulation comprises:

5 to 50 wt % water-miscible solvent;

0.5 to 10 wt % colorant;

0.1 to 10 wt % at least one core/shell polymeric binder;

1 to 30 wt % magnetic additive; and water.

The inks of the present invention comprise about 5 to 50 wt %, preferably about 10 to 25 wt %, water-miscible organic co-solvent, about 0.05 to 10 wt %, preferably about 0.5 to 10 wt %, colorant, about 0.0005 to 50 wt %, preferably about 0.1 to 10 wt %, more preferably about 0.5 to 5 wt %, durable core/shell polymer, about 0.0005 to 50 wt %, preferably about 0.1 to 10 wt %, more preferably about 0.5 to 5 wt %, primer core/shell polymer, about 1 to 30 wt % additive, and water.

In general, the permanent magnetic ink of the present invention can be formulated by a heavy co-encapsulation of the magnetic additive and the contrast-enhancing colorant in a suitable core/shell polymer. Examples of these techniques include:

(a) The encapsulation process can be done by jar mill, paint shaker, Sweeco mill, sand mill, or any conventional milling procedure well-known in the art of mixing, with or without milling media.

(b) The encapsulation process can be also carried out by just a simple stirring process in a beaker or in round bottom flask with or without nitrogen purging.

(c) The encapsulation can also be done by a successive heating-up and cooling-down process during the mixing.

(d) The encapsulation can also be done by a successive dissolving and evaporating process during the mixing.

Usually, a suitable co-solvent/water is preferred beyond the pure water system for mixing. For further enhancement of aqueous dispersibility of magnetic additive, especially hydrophobic additives, the following processes are applied:

(A) ABSORPTION OF HYDROPHILIC/ULTRAFINE MAGNETIC POWDER ON THE SURFACE OF HIGHLY POROUS CARBON BLACK. The ultrafine magnetic powder is supplied from Ferrofluid Company. The water-based product is composed of iron oxide finely dispersed in water and the particle size ranges between several tens of angstroms to several hundreds of Angstrom and the magnetic properties is about 100 Gauss to 1000 Gauss. Simply mixing of Ferrofluid product with a core/shell polymer already yields good ink. However, a considerable amount of iron oxide escapes from the core/shell polymer encapsulation, and the ink shows poor waterfastness and thus poor permanence. In this particular case, a better and good permanence of magnetic ink can be achieved by a post-magnetic treatment of water-dispersive carbon black. For example, a mixing of water-dispersive Ferrofluid and water-dispersive carbon black (particle size 100 to 200 nm) can be done by a paint shaker with glass beads (2 mm) for 2 hours in the presence of water. During the mixing, the fine particle iron oxide tends to adsorb on the surface of carbon black and the adsorption process continues to occur during the drying associated with water evaporation. The dried product is ready for dispersion in the core/shell polymer to yield good printable ink and good permanence after being dried.

(B) ADSORPTION OF WATER SOLUBLE BLACK DYE ON THE SURFACE OF HYDROPHOBIC MAGNETIC COMPONENT TO RENDER WATER DISPERSIBILITY. Hydrophobic magnetic powder can be dispersed as a dispersion in a hydrocarbon liquid. These components can be used for highly waterfastness ink formulation. However, the challenge is the aqueous dispersion stability. The adsorption of water-soluble black dye on the porous surface of solid/hydrophobic magnetic powder renders the aqueous dispersion stability, especially when the composite system is encapsulated in an aqueous emulsion core/shell polymer.

(C) ADSORPTION OF HYDROPHILIC MAGNETIC ADDITIVE ON THE SURFACE OF HYDROPHOBIC MAGNETIC COMPONENT TO RENDER WATER DISPERSIBILITY. The same purpose as described above for (B) and the adsorption process is carried out by wet milling of dried/solid hydrophobic magnetic powder in an aqueous dispersion of hydrophilic magnetic environment and then dehydrating it. During the water evaporation process, the ultra-fine particles of hydrophilic magnetic component are physically trapped on the surface of hydrophobic magnetic material. The dried composite product is ready to be exposed to a wet mill with the core/shell polymer for encapsulation. The encapsulated magnetic components are ready dispersed in water for ink formulation.

(D) CO-ADSORPTION OF ULTRAFINE MAGNETIC POWDER AND WATER-SOLUBLE BLACK DYE ON THE SURFACE OF WATER-DISPERSIVE SILICA. Here, silica is the carrier, and the ultrafine magnetic powder dispersed in water and water-soluble black dye are co-adsorbed on the surface of the silica. Removal of water leaves the black dye and the magnetic powder co-adsorbed on the surface of the silica.

(E) ADSORPTION OF HYDROPHOBIC MAGNETIC ADDITIVE ON HIGHLY POROUS CARBON BLACK SURFACE. Here, the magnetic powder dispersed in the hydrocarbon solvent is adsorbed on a highly porous carbon black surface. Removal of the solvent leaves the magnetic additive adsorbed on the carbon black surface.

In all instances, the magnetic powder and colorant are processed to form a powder in which one component is adsorbed on the surface of the other or on the surface of a carrier. The adsorption is performed in either an aqueous or oil medium, depending on the nature of the colorant. Removal of the water or oil provides the adsorbed powder, which is then encapsulated with the core/shell polymer herein and mixed with one or more co-solvents to form the magnetic ink.

The co-solvents comprise one or more organic, water-miscible solvents commonly employed in ink-jet printing. Classes of co-solvents employed in the practice of this invention include, but are not limited to, aliphatic alcohols, aromatic alcohols, diols, glycol ethers, poly(glycol) ethers, caprolactams, formamides, acetamides, and long chain alcohols. Examples of compounds employed in the practice of this invention include, but are not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1,ω-alcohols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkylethers, N-alkyl caprolactams, unsubstituted caprolactams, substituted formamides, unsubstituted formamides, substituted acetamides, and unsubstituted acetamides. Specific examples of co-solvents that are preferably employed in the practice of this invention include, but are not limited to, N-methyl pyrrolidone, 1,5-pentanediol, 2-pyrrolidone, diethylene glycol, 1,3-(2-methyl)-propanediol, 1,3,5-(2-methyl)-pentanetriol, tetramethylene sulfone, 3-methoxy-3-methylbutanol, glycerol, 1,2-alkyldiols, propylene glycol, glycerol, hexanediol, and heptanediol. Most preferably, the co-solvent is at least one of LEG-1, LEG-7, 2-pyrrolidone, N-methylpyrrolidone, polyalcohol (polyethylene glycol, polypropylene glycol, polyethylene glycol ester (acrylate, methacrylate), polypropylene glycol ester (acrylate, methacrylate), glycol acid (acrylate, methacrylate) and polypropylene glycol acid (acrylate, methacrylate)), diethylene glycol, triethylene glycol, tetraethylene glycol, 1,5-pentane diol, 1,2-hexane diol, cyclohexane diol, aromatic ethoxylate (Zeneca GB2R), and alkyl ethoxylate. LEG-1 and LEG-7 are glycols available from Liponics.

The balance of the ink is water, together with other additives commonly added to ink-jet inks, which are employed to optimize the properties of the ink for specific applications. For example, as is well-known to those skilled in the art, biocides may be used in the ink composition to inhibit growth of microorganisms, sequestering agents such as EDTA may be included to eliminate deleterious effects of heavy metal impurities, and buffer solutions may be used to control the pH of the ink. Other known additives such as viscosity modifiers and other acrylic or non-acrylic polymers may be added to improve various properties of the ink compositions as desired.

The additives of the present invention may also be used with dual core/shell polymers, such as those disclosed in co-pending applications Ser. No. 08/998,164, filed Dec. 24, 1997 and Ser. No. 09/120,270, filed Jul. 21, 1998, the contents of which are incorporated herein by reference. The magnetic additives of the present invention provide the printed ink with magnetic properties that enable the printed ink to be used for storage of magnetic data.

The printed magnetic ink may be read magnetically by vertical magnetization (area covered by the ink) or by perpendicular magnetization (thickness of ink), employing apparatus that is well-known in the field of magnetic reading and writing.

The formulations of the primer and durable core/shell polymers employ the same components as the above-described core/shell polymers, but with different concentrations, as shown in Table I below.

TABLE I

| | Core/Shell Polymer Formulations | |
|---|---|---|
| Component | Primer Core/Shell Polymer, wt % | Durable Core/Shell Polymer, wt % |
| A | 10–90 | 0–90 |
| B | 10–90 | 0–90 |
| C | 0–60 | 0–90 |
| D | 0–50 | — |
| E | 0–40 | 0.01–100 |

The ink-jet ink printing compositions of the present invention evidence superior magnetic properties, as compared to prior art ink-jet ink compositions, which are not magnetic and which are not permanent.

EXAMPLES

In the following examples, most of the monomers used were commercially available. The purity of such monomers is that found in normal commercial practice. Only the poly(ethylene glycol) methyl ether acrylate monomers of different molecular weights were prepared from the corresponding alcohol with acryloyl chloride in the presence of triethylamine by standard esterification process. Other monomers can be prepared by following conventional and well-known procedures of typical organic reactions.

Example 1

(Hexyl Acrylate)$_{10}$ (Methyl Methacrylate)$_{30}$ (Vinylpyrrolidone)$_{59}$ (D1)$_1$ Synthesis of core-shell polymer with hexyl acrylate (A), methyl methacrylate (MMA) (B), vinylpyrrolidone (C), and UV stabilizer (D1) (D) in the ratio of 10, 30, 59, and 1% by weight, respectively:

Hexyl acrylate (8 g), MMA (24 g), vinylpyrrolidone (47.2 g) and UV stabilizer D1(0.8 g) were mixed with BRIJ 92 (0.8 g), SOLSPERSE 27,000 (0.82 g), and isooctylmercaptopropionate (0.8 g) in water (12 g) to form an emulsion. The emulsion was saturated with nitrogen. Then the emulsion was added over a period of 1 hour to a solution of potassium persulfate (1.71 g) in water (703.09 g) at 80° C. The reaction mixture was maintained at 80° C. for 2.5 hour. The reaction mixture was then cooled to obtain the title polymer dispersed in water. The average particle size of the polymer solution was found to be 250 nm and the glass transition temperature ($T_g$) of the polymer obtained was 65° C.

Example 2

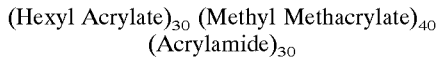

(Hexyl Acrylate)$_{30}$ (Methyl Methacrylate)$_{40}$ (Acrylamide)$_{30}$

Synthesis of core-shell polymer derived from hexyl acrylate (A), MMA (B), and acrylamide (E) in the ratio of 30, 40, and 30% by weight, respectively:

The monomers, hexyl acrylate (3 g), MMA (4 g), and acrylamide (3 g) were mixed in water (7 g) containing BRIJ 92 (0.22 g), Aerosol DPOS 45 (0.22 g), and isooctylmercaptopropionate (0.22 g) to form an emulsion. The emulsion was saturated with nitrogen and added dropwise to a solution of potassium persulfate (0.2 g) in water (82.14 g) at 100° C. Heating was continued for a period of 4 hours and cooled to obtain the title core-shell polymer. The average particle size of the polymer solution was found to be 200 nm and the glass transition temperature ($T_g$) of the polymer obtained was −10° and +125° C.

Examples 4–6

In the above Examples 1 to 3, the water-soluble components, such as vinylpyrrolidone (C), were replaced by poly(ethylene glycol) methyl ether acrylate (C) of molecular weight 404 (PEG-Ac(404)) in the corresponding amount to obtain core-shell polymer containing PEG-Ac(404). The resulting polymers and their average particle sizes and glass transition temperatures are given in Table II below.

TABLE II

Results of Examples 4–6.

| Polymer | Particle Size, nm | $T_g$, ° C. |
|---|---|---|
| (hexylacrylate)$_{10}$ (methyl methacrylate)$_{30}$ (PEG-Ac(404))$_{59}$ (d1)$_1$ - Ex. 4 | 150 | −10 |
| (hexyl acrylate)$_{30}$ (methyl methacrylate)$_{40}$ (PEG-Ac(404))$_{30}$ - Ex. 5 | 180 | 0 |
| (lauryl methacrylate)$_{10}$ (methyl methacrylate)$_{20}$ (PEG-Ac(404))$_{67}$ (d1)$_1$ (sodium styrene sulfonate)$_3$ | 150 | −10 |

Example 7

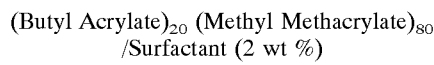

(Butyl Acrylate)$_{20}$ (Methyl Methacrylate)$_{80}$ /Surfactant (2 wt %)

Synthesis of polymer derived from butyl acrylate (A) and MMA (B) in the ratio of 20 and 80% by weight, respectively:

Butyl acrylate (4 g) and methyl methacrylate (16 g) were mixed with BRIJ 92 (0.2 g), SOLSPERSE 27,000 (0.2 g), and isooctylmercaptopropionate (0.2 g). An emulsion was prepared by adding water (2.0 g) to the above monomer mixture. The emulsion was saturated with nitrogen and added dropwise to a solution of potassium persulfate (0.4 g) in water (177 g) at 75° C. The reaction mixture was maintained at the same temperature for another 2 hr to obtain the title polymer/surfactant system dispersed in water. The average particle size of the polymer solution was found to be 165 nm and the glass transition temperature ($T_g$ of the polymer obtained was 63° C.

Examples 8–11; Comparison Examples 1–2

Testing of the physical properties of several durable, film-forming, water-dispersive polymers was performed and compared to prior art polymers. The tests involved a film-forming test, a water-dispersive stability test, and a measurement of the glass transition temperature, $T_g$.

(1) Film Forming Test.

The core/shell polymer of the invention was cast on a glass substrate and allowed to dry at ambient conditions for several hours. As the film-forming process occured, the milky color of the polymer solution gradually turned into a transparent film.

The formed film (on glass substrate) was soaked in water mixed with different solvents liquid additives (40% versus water) for 24 hrs and the weight loss was measured. The samples with the least weight loss samples are indicative of the most durable film.

(2) Water-Dispersive Stability Test.

The polymer emulsion was subjected to a centrifugation set at 4,000 rpm for 30 minutes. This is repeated twice. The amount of accumulation after centrifugation is an indication of the dispersion stability, with a higher amount of accumulation indicating less dispersion stability.

(3) Measurement of $T_g$.

The glass transition temperature was measured by Differential Scanning Calorimetry, using a DSC available from duPont de Nemours Company as Model 2.0.

The data accumulated from the foregoing tests are illustrated in the following Table III:

TABLE III

Results of Tests.

| Polymer | Solvent additives/ Weight loss (%) | Centrifugation Accumulation | $T_g$ (° C.) |
|---|---|---|---|
| (HA)$_{40}$ (MMA)$_{40}$ (PEGAc(404))$_{20}$ - Ex. 8 | Ethyl acetate, 0.05% | <0.5% | −10 |
| (octadecyl acrylate)$_{40}$ (methyl methacrylate)$_{40}$ (poly(ethylene glycol) methyl ether acrylate, mw = 404)$_{20}$ - Ex. 9 | Ethyl acetate, 0.05% | <0.1% | −10 |
| (acryloxypropylmethyldimethoxysilane)$_{30}$ (methyl methacrylate)$_{60}$ (poly(ethylene glycol) methyl ether acrylate, mw = 404)$_{20}$ - Ex. 10 | Ethyl acetate, 0.02% | <0.1% | 15 |
| (hexyl acrylate)$_{40}$ (maleimide)$_{40}$ (poly(ethylene glycol) methyl ether acrylate, mw = 404)$_{20}$ - Ex. 11 | Ethyl acetate, 0% | <0.01% | 60 |
| Comparison Example 1: (Styrene)$_{40}$ (Acrylic Acid)$_{60}$ | Ethyl acetate 80% | 30% | 100 |
| Comparison Example 2: Acrylic acid polymer | 100% | Soluble | 106 |

Example 12; Comparison Examples 3–4

Commercially available Cabot pigment plus polymer plus penetrating humectant plus non-penetrating humectant:

Example 12

In an 250 cm$^3$ glass jar were added 5.0 g of carbon black (Vulcan XR-72), 25.0 g of a polymer of the invention comprising $(HA)_{30}(MMA)_{40}(PEGAc(404))_{30}$ (10 wt % solid), 10 g diethylene glycol (as non-penetrating humectant), 10 g N-methyl pyrrolidone (NMP, as penetrating humectant), 0.02 g of fluoro surfactant (Fluorad 99; 3M Products). The components were milled together by a paint shaker using 2 mm zirconium beads for 2 hrs. After being milled, the system was diluted with water to achieve a final ink solution of 5 wt % solid. The Zr beads were removed by 200 mesh filtering. The ink solution was centrifuged to eliminate agglomerated solids and the like and refiltered again through a 5 µm glass filter. This solution was then ready for print testing.

In order to perform the print test, the ink was filled into the black ink cartridge of a Hewlett-Packard Company DeskJet printer prototype product and printed with a frequency of 20 Kz.

The optical density (OD) of the print was measured by Mac Beth densitometer.

The decap characteristic of the pen was characterized as the number of the streak lines appearing at the right hand side of a black solid band. As the pen prints right-to-left in the printer, this is an indication of the startup performance of the pen—how long it takes the dried nozzles to come back to full nozzle health.

The stability of the ink was judged by measuring the changing of the particle size after the temperature cycle (T-cycle) between 70° C. and −70° C.

The particle size measurement is carried out by a Nikon particle sizer.

The kogation effect is a phenomenon in which the pen cannot perform due to the deterioration of the firing resistor in the ink chamber due to a buildup of residue. So the kogation, generally, terminates the life of the pen. The kogation was measured by number of prints exhibiting unchanged print quality (PQ) diring continuous printing process of 100 pages. The higher the number, the lower the kogation effect.

The smearfastness was measured by the background optical density (in mOD) when a neighbor image area is wiped twice with a highlighter pen.

The waterfastness was measured by the background optical density (in mOD) when a water drip runs across an image area.

Comparison Example 3

Example 12 was repeated, except the polymer was replaced by poly(ethylene glycol) having molecular weight in the range of 5,000.

Comparison Example 4

Example 12 was repeated, except the polymer was replaced by 98% hydrolyzed polyvinyl alcohol, average molecular weight =4,000.

The print tests results for Examples 12 and Comparison Examples 3 and 4 are summarized in Table IV.

TABLE IV

Results of Example 12 and Comparison Examples 3–4.

| Example | Optical density (OD) | Decap (lines/cm) | Particle size change after T-cycle | # of prints before kogation | Smear fastness (mOD) | Water fastness (mOD) |
|---|---|---|---|---|---|---|
| 12 | 1.45 | 1.0 | +/− 3 nm | 100 | 35 | 0 |
| Comp. 3 | 1.40 | 1.0 | +/− 3 nm | 100 | 600 | 400 |
| Comp. 4 | 1.45 | 3.0 | +/− 5 nm | 40 | 600 | 420 |

Example 13

Adsorption of Ferrite (Magnetic Additive) on the Surface of Carbon Black

In a 250 cc amber glass jar, 5 g of carbon black powder (Vulcan XR72), 15 g liquid of ferrite powder pre-dispersed in hydrocarbon liquid (Ferrofluids Product, EMG 705, 20% solid, saturation magnetization is about 200 Gauss), 30 g IPA (isopropyl alcohol), 0.01 g of surfactant DC510 (Dow Corning) and 200 g glass beads (2 mm diameter) were added. The entire system was sealed and milled together using a paint shaker for 2 hours. The uniform, black slurry was completely isolated from milling media by a glass filter funished with a vacuum evaporator. Then, the IPA and hydrocarbon liquid from the black slurry were removed by a vacuum evaporator, yielding a black solid cake. The cake was dried in an oven at 90° C. for 3 hours. The dried solid was collected and ground into powdery black using a mortar and pestle. The magnetic properties of the final black achieved from above-mentioned process was confirmed by a magnet. The saturation magnetization of this product was about 50 Gauss. The saturation magnetization of the ink is measured by a customized (in-house) Vibrating Sample Magnetometer. This product is called powder (P13).

Example 14

Formulation of Ink-Jet Ink Component Having Magnetic Properties

Example 12 was repeated except that the carbon black was replaced by the magnetic black P13 prepared in example 13. The result is summarized in Table V.

Comparison Example 5

Comparison Example 4 was repeated except that the carbon black was replaced by magnetic black P 13. The test result is summarized in Table V.

TABLE V

Results of Example 14 and Comparison Example 5.

| Example | Optical density (OD) | Decap Lines/cm | Particle size change after T-cycle | # of prints before kogation | Smear fastness (mOD) | Wear fastness (mOD) | Saturation magnetization (Gauss) |
|---|---|---|---|---|---|---|---|
| 14 | 1.39 | 1.10 | +/− 4 nm | 100 | 34 | 0 | 30 |
| 12 | 1.45 | 1.10 | +/− 3 nm | 100 | 35 | 0 | 0 |
| Conventional* | 1.42 | — | — | — | 10 | 0 | 20 |
| Comp. 5 | 1.38 | 1.0 | +/− 4 nm | 100 | 600 | 400 | 28 |

*conventional security check printed by lithography.

Table V includes a comparison to presently-used security inking on, e.g., checks, printed with a magnetic ink by lithography. The magnetic ink of the present invention is seen to have a stronger saturation magnetization than the conventional magnetic lithographic ink.

Example 15

Adsorption of Hydrophilic Magnetic Additive onto Hydrophobic Magnetic Additive

100 g of aqueous suspension ferrite liquid (Ferrofluids EMG911, saturation magnetization 100 Gauss) was evaporated at 70° C. to give brown/black powder solid designated P15(a). 10 g of P14(a), 15 g liquid of ferrite powder pre-dispersed in hydrocarbon liquid (Ferrofluids Product, EMG 705, 20% solid, saturation magnetization is about 200 Gauss), 30 g IPA (iso-propyl alcohol), 0.01 g of surfactant DC510 (Dow Corning) and 200 g glass beads (2mm diameter) were milled together using a paint shaker for 2 hours. The uniform, black slurry was completely isolated from milling media by a glass filter furnished with a vacuum evaporator. Then, the IPA and hydrocarbon liquid from the black slurry were removed by a vacuum evaporator, yielding a black solid cake. The cake was dried in an oven at 90° C. for 3 hours. The dried solid was collected and ground into powdery black using a mortar and pestle. The magnetic properties of the final black achieved from above-mentioned process was confirmed by a magnet. The saturation magnetization of this product was about 50 Gauss. The saturation magnetization of the magnetic product is measured by a customized (in-house) Vibrating Sample Magnetometer. This product is called powder P15(b).

Example 16

Formulation of Magnetic Ink Using a Blended Magnetic Additive

Example 12 was repeated except that the carbon black was replaced by magnetic additive P15(b).

Example 17

Example 16 was repeated except that 1 g of black dye nigrosine was added.

Example 18

Example 4 was repeated except that the iron phthalocyanine (Aldrich Chemical) was used.

Comparison Example 6

Example 15 was repeated except that the dried blend product p15(b) was replaced by the hydrophilic EMG911 liquid as it is (without further treatment).

TABLE VI

Results of Examples 16–18 and Comparison Example 6.

| Example | Optical density (OD) | Decap (lines/cm) | Particle size change after T-cycle | # of prints before kogation | Smear fastness (mOD) | Wear fastness (mOD) | Saturation magnetization (Gauss) |
|---|---|---|---|---|---|---|---|
| 16 | 1.37 | 1.0 | +/− 4 nm | 100 | 35 | 0 | 32 |
| 17 | 1.40 | 1.0 | +/− 3 nm | 100 | 35 | 0 | 30 |
| Comp. 6 | 1.35 | 1.0 | +/− 3 nm | 100 | 400 | 300 | 25 |
| 18 | 1.2 | 1.1 | +/− 3 nm | 100 | 30 | 0 | 20 |

It is clear that without the pre-treatment by a dried blend or adsorption process, the hydrophilic ferrofluids cannot give good permanence to the ink.

The foregoing results show the superiority of an ink containing the magnetic additive of the invention as compared to inks that do not contain the additive of the invention. Specifically, magnetic properties are provided, and kogation is reduced and smear-fastness and water-fastness are considerably improved, as are optical density and decel, compared with prior art inks that do not contain the combination of magnetic additive and core/shell polymer.

Thus, there has been disclosed magnetic ink-jet ink printing compositions having superior smearfastness. It will be appreciated by those skilled in the art that various changes and modifications of an obvious nature may be made, and all such changes and modifications are considered to fall within the scope of the invention.

What is claimed is:

1. An ink-jet printing ink composition consisting essentially of a vehicle, a colorant, at least one property-optimizing additive, at least one core/shell polymeric binder to increase smearfastness of said composition, and a magnetic additive, said core/shell polymeric binder having a formula given by $$[(A)_m(B)_n(C)_p(D)_q(E)_r]_x$$

wherein A, B, C, D, and E are moieties as follows:
- A=at least one hydrophobic component contributing to improved durable, film-forming properties selected from moieties which, when homopolymerized to a solid state, have a glass transition temperature ($T_g$) in the range between −150° and +25° C.;
- B=at least one hydrophobic and solvent barrier moiety used to adjust the $T_g$ of the hydrophobic component of said polymer which, when homopolymerized to a solid state, has a $T_g$ greater than 25° C.;
- C=at least one hydrophilic component comprising a water-soluble monomer;
- D=at least one UV absorber;
- E=at least one moiety having at least one highly polar functional group;
- m=5 to 95 wt %;
- n=5 to 95 wt %;
- p=0 to 60 wt %;
- q=0 to 50 wt %;
- r=0 to 30 wt %;
- m+n+p+q+r=100 wt %; and
- x=1 to 100,000, with the proviso that at least one of said C and E moieties must present wherein said polymer has either hydrophobic and hydrophilic moieties or has only hydrophobic moieties and is associated with said surfactant to form a polymer/surfactant system, said polymer or polymer/surfactant system capable of forming a film from water, which, upon dehydration, is essentially resistant to water, said polymer having a $T_g$ within the range of about −10° to +110° C., said magnetic additive consisting essentially of at least one inorganic magnetic compound containing at least one of iron, cobalt, and nickel cations or at least one organic magnetic complex containing at least one of iron, cobalt, and nickel cations or at least one organic complex or charge transfer complex exhibiting magnetic properties, said polymer serving to disperse both said colorant and said magnetic additive in said ink composition, said ink composition being free of any other dispersant.

2. The ink-jet ink of claim 1 wherein said polymeric binder has a formula given by $$[(A)_m(B)_n(C')_p]_x$$

wherein
- A=at least one hydrophobic component contributing to improved durable, film-forming properties selected from moieties which, when homopolymerized to a solid state, have a glass transition temperature ($T_g$) less than 25° C.;
- B=at least one hydrophobic and solvent barrier moiety used to adjust the $T_g$ of the hydrophobic component of said polymer which, when homopolymerized to a solid state, has a $T_g$ greater than 25° C.;
- C'=at least one hydrophilic component comprising a water-soluble monomer that is either ionic or non-ionic selected from the group consisting of C and E moieties;
- m>40 wt %;
- n<30 wt %; and
- p<30 wt %.

3. The inkjet ink of claim 1 wherein said A moiety is $$CR_1R_2=C(R_3)R_4R_5,$$

where $R_1$ and $R_2$ are independently hydrogen, halogen, alkyl, aryl, or substituted alkyl or aryl, or vinyl butyral,
$R_3$ is hydrogen, halogen, saturated or unsaturated alkyl, alkoxy, aryl, or substituted alkyl, alkoxy, or aryl,
$R_4$ is direct bond, O, CO, NH, halogen, saturated or unsaturated alkyl, aryl, or substituted alkyl, aryl, or CN,
with the proviso that if $R_4$ is alkyl, aryl, or substituted alkyl or aryl, then $R_5$ is absent; otherwise $R_5$ is direct bond, hydrogen, NH, O, alkyl, alkylene, aryl, or substituted alkyl, alkylene, or aryl, and
and with the further proviso that if $R_4$ is alkyl, aryl, or substituted alkyl or aryl or if $R_5$ is hydrogen, alkyl, aryl, or substituted alkyl or aryl, then $R_6$ is absent; otherwise $R_6$ is $NH_2$, saturated or unsaturated alkyl, alkoxy, aryl, aroxy, or substituted alkyl or aryl, and
where said alkyl, alkylene, aryl, alkoxy, and aroxy each contain more than 1 carbon atom and less than 40 carbon atoms.

4. The ink-jet ink of claim 3, wherein said A moiety is selected from the group consisting of ethyl acrylate; ethyl methacrylate; benzyl acrylate; benzyl methacrylate; propyl acrylate; propyl methacrylate; iso-propyl acrylate; iso-propyl methacrylate; butyl acrylate; butyl methacrylate; hexyl acrylate; hexyl methacrylate; octadecyl methacrylate; octadecyl acrylate; lauryl methacrylate; lauryl acrylate; hydroxyethyl acrylate; hydroxyethyl methacrylate; hydroxyhexyl acrylate; hydroxyhexyl methacrylate; hydroxyoctadecyl acrylate; hydroxyoctadecyl methacrylate; hydroxylauryl methacrylate; hydroxylauryl acrylate; phenethyl acrylate; phenethyl methacrylate; 6-phenylhexyl acrylate; 6-phenylhexyl methacrylate; phenyllauryl acrylate; phenyllauryl methacrylate; 3-nitrophenyl-6-hexyl methacrylate; 3-nitrophenyl-18-octadecyl acrylate; ethyleneglycol dicyopentyl ether acrylate; vinyl ethyl ketone; vinyl propyl ketone; vinyl hexyl ketone; vinyl octyl ketone; vinyl butyl ketone; cyclohexyl acrylate; 3-methacryloxypropyldimethylmethoxysilane; 3-methacryloxypropylmethyldimethoxysilane; 3-methacryloxypropylpentamethyldisiloxane; 3-methacryloxypropyltris(trimethylsiloxy)silane; 3-acryloxypropyldimethylmethoxysilane; acryloxypropylmethyldimethoxysilane, trifluoromethyl styrene, trifluoromethyl acrylate, trifluoromethyl methacrylate, tetrafluoropropyl acrylate, tetrafluoropropyl methacrylate, heptafluorobutyl methacrylate, iso-butyl acrylate, iso-butyl methacrylate, 2-ethylhexyl acrylate, 2-ethylhexyl methacrylate, iso-octyl acrylate, iso-octyl methacrylate, N,N-dihexyl acrylamide, N,N-dioctyl acrylamide, aminoethyl acrylate; aminoethyl methacrylate; aminoethyl butacrylate; aminoethylphenyl acrylate; aminopropyl acrylate; aminopropyl methacrylare; amino- iso-propyl acrylate; aminoisopropyl methacrylate; aminobutyl acrylate; aminobutyl methacrylate; aminohexyl acrylate; aminohexyl methacrylate; aminooctadecyl methacrylate; aminooctadecyl acrylate; aminolauryl methacrylate; aminolauryl acrylate; N,N-dimethyl-aminoethyl acrylate; N,N-dimethylaminoethyl methacrylate; N,N-diethylaminoethyl acrylate; N,N-diethylaminoethyl methacrylate; piperidino-N-ethyl acrylate, vinyl propionate; vinyl acetate; vinyl butyrate; vinyl butyl ether; and vinyl propyl ether.

5. The ink-jet ink of claim 1 wherein said B moiety is $$CR_1R_2=C(R_3)R''_4R''_5R''_6$$

where $R_1$ and $R_2$ are independently selected from hydrogen, halogen, and vinyl butyral, $R_3$ is hydrogen, halogen, saturated or unsaturated alkyl, alkoxy, aryl, or substituted alkyl, alkoxy, or aryl, $R''_4$ is direct bond, O, CO, NH, halogen, saturated or unsaturated alkyl, aryl, or substituted alkyl, aryl, or CN, with the proviso that if $R''_4$ is alkyl, aryl, or substituted alkyl or aryl, then $R''_5$ is absent; otherwise $R''_5$ is direct bond, hydrogen, NH, O, alkyl, alkylene, aryl, or substituted alkyl, alkylene, or aryl, and and with the further proviso that if $R''_4$ is alkyl, aryl, or substituted alkyl or aryl or if $R''_5$ is hydrogen, alkyl, aryl, or substituted alkyl or aryl, then $R''_6$ is absent; otherwise $R''_6$ is $NH_2$, saturated or unsaturated alkyl, alkoxy, aryl, aroxy, or substituted alkyl or aryl, and where said alkyl, alkylene, aryl, alkoxy, and aroxy each contain from 1 to 40 carbon atoms, where $R_1$ and $R_2$ and $R_2$ and $R_3$ can each form a ring, and where $R''_4$ and $R''_5$ can form a ring through nitrogen or oxygen.

6. The ink-jet ink of claim 5 wherein said B moiety is selected from the group consisting of ethylene; styrene; vinyl carbazole; vinyl naphthalalene; vinyl anthracene; vinyl pyrene; methyl methacrylate; methyl acrylate; alpha-methylstyrene; dimethylstyrene; methylstyrene; vinylbiphenyl; glycidyl acrylate; glycidyl methacrylate; glycidyl propylene; 2-methyl-2-vinyl oxirane; vinyl pyrridine, aminoethyl acrylate, aminoethyl methacrylate, maleimide; N-phenyl maleimide; N-hexyl maleimide; N-vinylphthalimide; and N-vinyl maleimide.

7. The ink-jet ink of claim 1 wherein said C moiety is selected from the group consisting of (a)

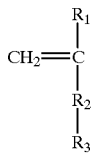

where $R_1$=H, halogen, alkyl, aryl, or substituted alkyl or aryl; and $R_2$=direct bond, O, CO, NH, or CONH;

$R_3$=OH, $(CH_2CH_2O)_yR_4$, $(CH_2CH(CH_3)O)_yR_4$, $(CH_2CH(C_2H_5)O)_yR_4$, SH, $(CH_2CH_2S)_yR_4$, $(CH_2CH(CH_3)S)_yR_4$, or $(CH_2CH(C_2H_5)S)_yR_4$;

y=1 to 200; and $R_4$=alkyl, aryl, substituted alkyl or aryl;

(b)

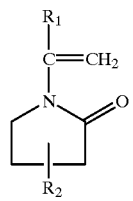

where $R_1$ and $R_2$ are independently selected from H, halogen, alkyl, aryl, and substituted alkyl and aryl, where said alkyl and aryl each contain from 2 to 40 carbon atoms;

(c)

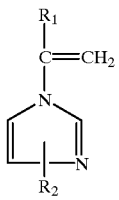

where $R_1$ and $R_2$ are independently selected from H, halogen, alkyl, aryl, and substituted alkyl and aryl;

(d)

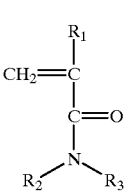

where $R_1$=H, halogen, alkyl, aryl or substituted alkyl or aryl; and $R_2$ and $R_3$ are either independently selected from alkyl, aryl, and substituted alkyl and aryl or can form either an aliphatic ring or an aromatic ring.

8. The ink-jet ink of claim 7 wherein said C moiety is selected from the group consisting of poly(ethylene glycol) methyl ether acrylate of average molecular weight 404; poly(ethylene glycol) methyl ether methacrylate of average molecular weight 418; poly(ethylene glycol) methyl ether methacrylate of average molecular weight 2068; poly(ethylene glycol) methyl ether acrylate of average molecular weight 2054; polyvinyl alcohol; vinyl pyrrolidone, vinyl 4-methylpyrrolidone, vinyl 4-phenylpyrrolidone; vinyl imidazole, vinyl 4-methylimidazole, vinyl 4-phenylimidazole; acrylamide; methacrylamide; N,N-dimethyl acrylamide; N-methyl acrylamide; N-methyl methacrylamide; aryloxy piperidine; and N,N-diethyl acrylamide.

9. The ink-jet ink of claim 1 wherein said D moiety consists essentially of (11)

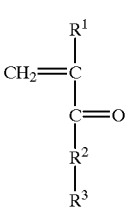

-continued $R^1$ = H, Alkyl, aryl, substituted alkyl or aryl
$R^2$ = O or NH
$R^3$ =

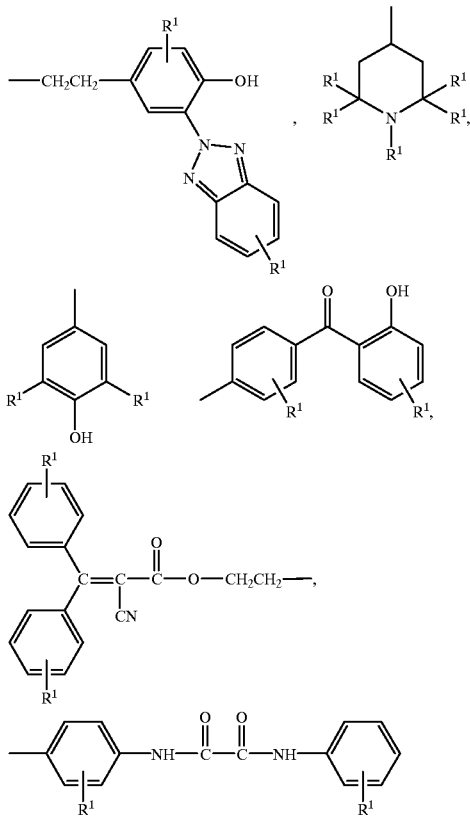

10. The ink-jet ink of claim 1 wherein said E moiety is selected from the group consisting of

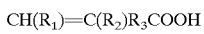 (a)

where $R_1$=H, COOH, COOR$_4$, ;
$R_2$=H, halogen, alkyl, aryl, alkoxyl, substituted alkyl, aryl or alkoxyl;
$R_3$=direct bond, alkylene, arylene, or sustituted alkylene or arylene; and
$R_4$=alkyl, aryl, or substituted alkyl or aryl;

 (b)

where $R_1$=alkylene, arylene, substituted alkylene or arylene, or SO$_2$; and
$R_2$ and $R_3$ are either independently selected from H, alkyl, aryl, and substituted alkyl, aryl and alkoxyl or form either an aliphatic or aromatic ring;

 (c)

where $R_1$=alkylene, arylene, substituted alkylene or arylene;
y=1 to 4; and
$M^{y+}$=NH$_4^+$, Li$^+$, Na$^+$, K$^+$, Ca$^{2+}$, Mg$^{2+}$, Al$^{3+}$, Ti$^{4+}$, triethylammonium, diethylammonium, and pyrridinium;

 (d)

where $R_1$=alkylene, arylene, substituted alkylene or arylene, COO, or cyclic ring containing nitrogen;

$R_2$, $R_3$, and $R_4$ are independently selected from H, alkyl, aryl, alkoxyl, and substituted alkyl, aryl and alkoxyl;
z=1 to 4; and
X=halogen, BF$_4$, PF$_6$, ClO$_4$, SCN, CNO, CNS;

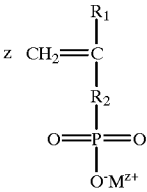 (e)

where $R_1$=H, alkyl, aryl, alkoxyl, substituted alkyl, aryl or alkoxyl;
$R_2$=direct bond, alkylene, arylene, or substituted alkylene or arylene;
z=1 to 4; and
$M^{z+}$=NH$_4^+$, Li$^+$, Na$^+$, K$^+$, Ca$^{2+}$, Mg$^{2+}$, Al$^{3+}$, Ti$^{4+}$, triethylammonium, diethylammonium, and pyrridinium;

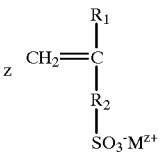 (f)

where $R_1$=H, alkyl, aryl, alkoxyl, or substituted alkyl, aryl or alkoxyl;
$R_2$=direct bond, COOR$_3$, arylene, alkylene, or —CONHR$_3$;
$R_3$=alkylene, arylene, or substituted alkylene or arylene, or fluoroalkylene;
z=1 to 4; and
$M^{z+}$=NH$_4^+$, Li$^+$, Na$^+$, K$^+$, Ca$^{2+}$, Mg$^{2+}$, Al$^{3+}$, Ti$^{4+}$;

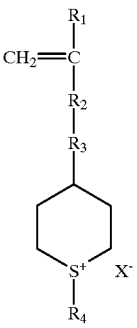 (g)

where $R_1$=—H, halogen, alkyl, or aryl;
$R_2$=>CO, —O—;
$R_3$=direct bond, >NH;
$R_4$=alkyl or aryl; and $X=Cl, Br, BF_4, ClO_4, I$, or $NO_3$;

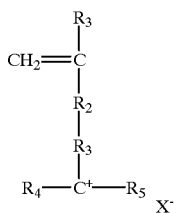
(h)

where $R_1=$ -H, halogen, alkyl, or aryl;

$R_2=>CO, —O—$;

$R_3=$ direct bond, >NH, alkylene, or arylene;

$R_4$ and $R_5$ are independently selected from alkyl or aryl; and $X=SbF_5^-, FSO_3^-$;

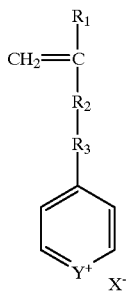
(i)

where $Y=O$ or $S$;

$R_1=$ —H, halogen, alkyl, or aryl;

$R_2=>CO, —O—$;

$R_3=$ direct bond, >NH, alkylene, or arylene;

$X=Cl, Br, I, ClO_4, BF_4$; and (j) a tetrazolium salt.

11. The ink-jet ink of claim 10 wherein said E moiety is selected from the group consisting of acrylic acid; methacrylic acid; chloromethacrylic acid; maleic acid; allylamine; N,N-diethylallylamine; vinyl sulfonamide; sodium acrylate; sodium methacrylate; ammonium acrylate; ammonium methacrylate; acrylamidopropanetriethylammonium chloride; methacrylamidopropanetriethylammonium chloride; vinylpyridine hydrochloride; sodium vinyl phosphonate; sodium 1-methylvinylphosphonate; sodium vinyl sulfonate; sodium 1-methylvinylsulfonate; sodium styrenesulfonate; sodium acrylamidopropanesulfonate; sodium methacrylamidopropanesulfonate; and sodium vinyl morpholine sulfonate.

12. The ink-jet ink of claim 1 wherein said polymer is selected from the group consisting of (hexyl acrylate)$_{40}$ (methyl methacrylate)$_{40}$ (poly(ethylene glycol) methyl ether acrylate, mw=404)$_{20}$; (hexyl acrylate)$_{30}$ (methyl methacrylate)$_{50}$ (poly(ethylene glycol) methyl ether acrylate, mw=404)$_{20}$; (hexyl acrylate)$_{20}$ (methyl methacrylate)$_{60}$ (poly(ethylene glycol) methyl ether acrylate, mw=404)$_{20}$; (hexyl acrylate)$_{40}$ (methyl methacrylate)$_{40}$ (poly(ethylene glycol) methyl ether acrylate, mw=2054)$_{20}$; (hexyl acrylate)$_{30}$ (methyl methacrylate)$_{50}$ (poly(ethylene glycol) methyl ether acrylate, mw=2054)$_{20}$; (hexyl acrylate)$_{20}$ (methyl methacrylate)$_{60}$ (poly(ethylene glycol) methyl ether acrylate, mw=2054)$_{20}$; (hexyl acrylate)$_{40}$ (methyl methacrylate)$_{40}$ (poly(ethylene glycol) methyl ether acrylate, mw=218)$_{20}$; (hexyl acrylate)$_{30}$ (methyl methacrylate)$_{50}$ (poly(ethylene glycol) methyl ether acrylate, mw=218)$_{20}$; (hexyl acrylate)$_{20}$ (methyl methacrylate)$_{60}$ (poly(ethylene glycol) methyl ether acrylate, mw=218)$_{20}$; (ethyl acrylate)$_{40}$ (methyl methacrylate)$_{40}$ (poly(ethylene glycol) methyl ether acrylate, mw=404)$_{20}$; (propyl acrylate)$_{40}$ (methyl methacrylate)$_{40}$ (poly(ethylene glycol) methyl ether acrylate, mw=404)$_{20}$; (butyl acrylate)$_{40}$ (methyl methacrylate)$_{40}$ (poly(ethylene glycol) methyl ether acrylate, mw=404)$_{20}$; (octadecyl acrylate)$_{40}$ (methyl methacrylate)$_{40}$ (poly(ethylene glycol) methyl ether acrylate, mw=404)$_{20}$; (lauryl methacrylate)$_{40}$ (methyl methacrylate)$_{40}$ (poly(ethylene glycol) methyl ether acrylate, mw=404)$_{20}$; (octadecyl methacrylate)$_{40}$ (methyl methacrylate)$_{40}$ (poly(ethylene glycol) methyl ether acrylate, mw=404)$_{20}$; (hydroxyoctadecyl acrylate)$_{40}$ (methyl methacrylate)$_{40}$ (poly(ethylene glycol) methyl ether acrylate, mw=404)$_{20}$; (hydroxyethyl acrylate)$_{40}$ (methyl methacrylate)$_{40}$ (poly(ethylene glycol) methyl ether acrylate, mw=404)$_{20}$; (hydroxylauryl methacrylate)$_{40}$ (methyl methacrylate)$_{40}$ (poly(ethylene glycol) methyl ether acrylate, mw=404)$_{20}$; (phenethyl acrylate)$_{40}$ (methyl methacrylate)$_{40}$ (poly(ethylene glycol) methyl ether acrylate, mw=404)$_{20}$; (6-phenylhexyl acrylate)$_{40}$ (methyl methacrylate)$_{40}$ (poly(ethylene glycol) methyl ether acrylate, mw=404)$_{20}$; (cyclohexyl acrylate)$_{40}$ (methyl methacrylate)$_{40}$ (poly(ethylene glycol) methyl ether acrylate, mw=404)$_{20}$; (acryloxypropylmethyldimethoxysilane)$_{30}$ (methyl methacrylate)$_{50}$ (poly(ethylene glycol) methyl ether acrylate, mw=404)$_{20}$; (N,N-dihexyl acrylamide)$_{20}$ (methyl methacrylate)$_{60}$ (poly(ethylene glycol) methyl ether acrylate, mw=404)$_{20}$; (aminopropyl acrylate)$_{40}$ (methyl methacrylate)$_{40}$ (poly(ethylene glycol) methyl ether acrylate, mw=2054)$_{20}$; (aminohexyl acrylate)$_{30}$ (methyl methacrylate)$_{50}$ (poly(ethylene glycol) methyl ether acrylate, mw=2054)$_{20}$; (aminolauryl methacrylate)$_{20}$ (methyl methacrylate)$_{60}$ (poly(ethylene glycol) methyl ether acrylate, mw=2054)$_{20}$; (N,N-dimethylaminoethyl acrylate)$_{40}$ (methyl methacrylate)$_{40}$ (poly(ethylene glycol) methyl ether acrylate, mw=218)$_{20}$; (vinyl acetate)$_{30}$ (methyl methacrylate)$_{50}$ (poly(ethylene glycol) methyl ether acrylate, mw=218)$_{20}$; (vinyl butyl ether)$_{20}$ (methyl methacrylate)$_{60}$ (poly(ethylene glycol) methyl ether acrylate, mw=218)$_{20}$; (hexyl acrylate)$_{40}$ (styrene)$_{40}$ (poly(ethylene glycol) methyl ether acrylate, mw=404)$_{20}$; (hexyl acrylate)$_{30}$ (dimethyl styrene)$_{50}$ oly(ethylene glycol) methyl ether acrylate, mw=404)$_{20}$; (hexyl acrylate)$_{20}$ (trifluoromethyl styrene)60 (poly(ethylene glycol) methyl ether acrylate, mw=404)$_{20}$; (hexyl acrylate)$_{40}$ (tetrafluoropropyl methacrylate)$_{40}$ (poly(ethylene glycol) methyl ether acrylate, mw=2054)$_{20}$; (hexyl acrylate)$_{30}$ (glycidyl methacrylate)$_{50}$ (poly(ethylene glycol) methyl ether acrylate, mw=2054)$_{20}$; (hexyl acrylate)$_{20}$ (glycidyl acrylate)$_{60}$ (poly(ethylene glycol) methyl ether acrylate, mw=2054)$_{20}$; (hexyl acrylate)$_{40}$ (maleimide)$_{40}$ (poly(ethylene glycol) methyl ether acrylate, mw=218)$_{20}$; (hexyl acrylate)$_{50}$ (n-hexyl maleimide)$_{30}$ (poly(ethylene glycol) methyl ether acrylate, mw=218)$_{20}$; (hexyl acrylate)$_{40}$ (n-vinyl maleimide)$_{40}$ (poly(ethylene glycol) methyl ether acrylate, mw=218)$_{20}$; (hexyl acrylate)$_{40}$ (methyl methacrylate)$_{40}$ (vinyl pyrrolidone)$_{20}$; (hexyl acrylate)$_{40}$ (methyl methacrylate)$_{40}$ (vinyl 4-methylpyrrolidone)$_{20}$; (hexyl acrylate)$_{40}$ (methyl methacrylate)$_{40}$ (vinyl imidazole)$_{20}$; (hexyl acrylate)$_{40}$ (methyl methacrylate)$_{40}$ (acrylamide)$_{20}$; (hexyl acrylate)$_{40}$ (methyl methacrylate)$_{40}$ (4-methyl acrylamide)$_{20}$; (hexyl acrylate)$_{50}$ (methyl methacrylate)$_{45}$ (poly(ethylene glycol) methyl ether acrylate, mw=404)$_{5}$; (hexyl acrylate)$_{50}$ (methyl methacrylate)$_{40}$ (poly(ethylene glycol) methyl ether acrylate, mw=404)$_{10}$; and (hexyl acrylate)$_{50}$ (methyl methacrylate)$_{35}$ (poly(ethylene glycol) methyl ether acrylate, mw=404)$_{15}$.

13. The ink-jet ink of claim 1 wherein said polymer is selected from the group consisting of (hexyl acrylate)$_{40}$ (methyl methacrylate)$_{40}$ (acrylic acid)$_{20}$; (hexyl acrylate)$_{60}$ (methyl methacrylate)$_{20}$ (methacrylic acid)$_{20}$; (hexyl acrylate)$_{40}$ (methyl methacrylate)$_{40}$ (maleic acid)$_{20}$; (hexyl acrylate)$_{40}$ (methyl methacrylate)$_{40}$ (vinyl benzoic acid)$_{20}$; (hexyl acrylate)$_{40}$ (methyl methacrylate)$_{40}$ (vinyl sulfonamide)$_{20}$; (hexyl acrylate)$_{40}$ (methyl methacrylate)$_{40}$ (sodium acrylate)$_{20}$; (hexyl acrylate)$_{40}$ (methyl methacrylate)$_{40}$ (ammonium acrylate)$_{20}$; (hexyl acrylate)$_{40}$ (methyl methacrylate)$_{40}$ (ammonium methacrylate)$_{20}$; (ethyl acrylate)$_{40}$ (methyl methacrylate)$_{40}$ (acrylamidopropanetriethyl-ammonium chloride)$_{20}$; (propyl acrylate)$_{40}$ (methyl methacrylate)$_{40}$ (vinyl pyridine hydrochloride)$_{20}$; (butyl acrylate)$_{40}$ (methyl methacrylate)$_{40}$ (sodium vinyl phosphate)$_{20}$; (hexyl acrylate)$_{40}$ (methyl methacrylate)$_{40}$ (sodium styrene sulfonate)$_{20}$; and (methyl methacrylate)$_{32}$ (hexyl acrylate)$_{46}$ (poly(ethylene glycol) methyl ether acrylate, mw=404)$_{12}$ (acrylic acid)$_{10}$.

14. The ink-jet ink of claim 1 wherein said inorganic magnetic compound is selected from the group consisting of iron oxides, cobalt oxides, nickel oxides, and ferrite powders containing at least one of iron, nickel, and cobalt, neodymium-iron-boron, samarium cobalt, aqueous suspended ferrites, and oil-suspended ferrites.

15. The ink-jet ink of claim 1 wherein said organic magnetic complex is selected from the group consisting of phthalocynanines of iron, cobalt, and nickel, porphyrins of iron, cobalt, and nickel, metallocenes of iron, cobalt, and nickel, hemoglobin, and quinacridon derivatives.

16. The ink-jet ink of claim 1 wherein said charge transfer complex comprises 7,7,8,8-tetracyanoquinodimethane/tetrathiafulvalene.

17. The ink-jet ink of claim 1 wherein said colorant and said core/shell polymeric binder are present in a ratio within a range of about 10:1 to 1:10.

18. The ink-jet ink of claim 17 wherein said ratio is between about 5:1 and 1:5.

19. The ink-jet ink of claim 18 wherein said ratio is between about 3:1 and 1:3.

20. The ink-jet ink of claim 1 wherein said magnetic additive is present in said ink within a range of about 1 to 30 wt %.

21. The ink-jet ink of claim 20 wherein said range is about 3 to 5 wt %.

22. The ink-jet ink of claim 1 wherein said ink comprises:

5 to 50 wt % water-miscible solvent;

5 to 10 wt % colorant;

1 to 10 wt % at least one said core/shell polymeric binder;

1 to 30 wt % at least one said magnetic additive; and water.

23. A method of formulating a magnetic ink-jet ink consisting essentially of at least one core/shell polymeric binder at least one magnetic additive, at least one colorant, a vehicle, and at least one property-enhancing additive, said method comprising:

(a) forming said at least one core/shell polymeric binder to increase smearfastness of said ink, said core/shell polymer having a formula given by $$[(A)_m(B)_n(C)_p(D)_q(E)_r]_x$$

wherein A, B, C, D, and E are moieties as follows:

A=at least one hydrophobic component contributing to improved durable, film-forming properties selected from moieties which, when homopolymerized to a solid state, have a glass transition temperature ($T_g$) in the range between −150° and +25° C.;

B=at least one hydrophobic and solvent barrier moiety used to adjust the $T_g$ of the hydrophobic component of said polymer which, when homopolymerized to a solid state, has a $T_g$ greater than 25° C.;

C=at least one hydrophilic component comprising a water-soluble monomer;

D=at least one UV absorber;

E=at least one moiety having at least one highly polar functional group;

m=5 to 95 wt %;

n=5 to 95 wt %;

p=0 to 60 wt %;

q=0 to 50 wt %;

r=0 to 30 wt %;

m+n+p+q+r=100 wt %; and x=1 to 100,000, with the proviso that at least one of said C and E moieties must be present, wherein said at least one polymer has either hydrophobic and hydrophilic moieties or has only hydrophobic moieties and is associated with said surfactant to form a polymer/surfactant system, said at least one polymer or polymer/surfactant system capable of forming a film from water, which, upon dehydration, is essentially resistant to water, said polymer having a $T_g$ within the range of about −10° to +110° C.;

(b) blending said at least one polymer or polymer/surfactant system with said at least one magnetic additive and said at least one colorant, said at least one magnetic additive consisting essentially of at least one inorganic magnetic compound containing at least one of iron, cobalt, and nickel cations or at least one organic magnetic complex containing at least one of iron, cobalt, and nickel cations or at least one organic charge transfer complex exhibiting magnetic properties to form a blended mixture; and (c) adding said vehicle and said at least one property-optimizing additive to said blended mixture to form said ink, said vehicle comprising at least one water-miscible organic co-solvent and water.

24. The method of claim 23 wherein said inorganic magnetic compound and said colorant are first processed to adsorb said; inorganic compound on said colorant, said colorant on said inorganic compound or both on a separate carrier.

* * * * *

UNITED STATES PATENT AND TRADEMARK OFFICE
CERTIFICATE OF CORRECTION

PATENT NO.   : 6,248,805 B1                                        Page 1 of 1
DATED        : June 19, 2001
INVENTOR(S)  : Nguyen et al.

It is certified that error appears in the above-identified patent and that said Letters Patent is hereby corrected as shown below:

Column 30,
Line 67, delete "property-".

Column 31,
Line 1, delete "optimizing" and insert therefor -- ink --.
Line 1, delete "additive," and insert therefor -- additive selected from the group consisting of biocides, sequestering agents, buffer solutions, and viscosity modifiers, --.
Line 47, delete "composition, said ink composition being" and insert therefor -- composition. --.
Line 48, delete "free of any other dispersant."

Column 39,
Line 48, delete "5" and insert therefor -- 0.5 --.
Line 49, delete "1" and insert therefor -- 0.1 --.
Line 55, delete "property-enhancing" and insert therefor -- ink --.
Line 55, delete "additive," and insert therefor -- additive selected from the group consisting of biocides, sequestering agents, buffer solutions, and viscosity modifiers, --.

Column 40,
Line 50, delete "property-".
Line 51, delete "optimizing" and insert therefor -- ink --.

Signed and Sealed this

Thirtieth Day of December, 2003

JAMES E. ROGAN
*Director of the United States Patent and Trademark Office*